(12) United States Patent
Fukumoto et al.

(10) Patent No.: US 6,891,283 B2
(45) Date of Patent: May 10, 2005

(54) STEERING APPARATUS FOR A VEHICLE

(75) Inventors: Yasutaka Fukumoto, Toyota (JP); Hajime Kamimae, Okazaki (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 59 days.

(21) Appl. No.: 10/330,201

(22) Filed: Dec. 30, 2002

(65) Prior Publication Data

US 2003/0127273 A1 Jul. 10, 2003

(30) Foreign Application Priority Data

Jan. 8, 2002 (JP) .......................................... 2002-001467
Dec. 20, 2002 (JP) .......................................... 2002-370890

(51) Int. Cl.[7] .................................................. B60L 1/00
(52) U.S. Cl. ...................... 307/10.1; 307/9.1; 180/444; 180/446; 70/252
(58) Field of Search ................................. 307/9.1, 10.1; 180/444, 446; 70/252

(56) References Cited

U.S. PATENT DOCUMENTS 6,226,569 B1    5/2001  Peter et al.
6,354,396 B1 *  3/2002  Horton et al. .............. 180/446
6,536,293 B2 *  3/2003  Shiba ..................... 73/862.193

FOREIGN PATENT DOCUMENTS

| DE | 197 16 866 C1 | 7/1998 | |
|---|---|---|---|
| EP | 630800 A1 * | 12/1994 | ............ B62D/5/04 |
| EP | 1 060 946 A2 | 12/2000 | |
| JP | A 2000-352502 | 12/2000 | |
| JP | A 2001-194251 | 7/2001 | |

\* cited by examiner

Primary Examiner—Robert L. DeBeradinis
(74) Attorney, Agent, or Firm—Oliff & Berridge PLC

(57) ABSTRACT

A steering apparatus of a vehicle can achieve detection of an absolute angle of a steering shaft with a simple structure while preventing an increase in power consumption. A resolver sensor outputs an output signal corresponding to an angular position of a steering shaft of the vehicle. A lock mechanism restricts rotation of the steering shaft at locking positions provided around the steering shaft at equal intervals. An axial multiplication angle k× of the output signal of the resolver sensor and a number N of the locking positions provided around the steering shaft satisfy a relationship represented by k≦N.

14 Claims, 10 Drawing Sheets

STEERING APPARATUS FOR A VEHICLE

BACKGROUND OF THE INVENTION

1. Field of the Invention

The present invention generally relates to vehicle steering apparatuses and, more particularly, to a steering apparatus of a vehicle suitable for detecting an absolute angle of a steering shaft by using a sensor located near the steering shaft of the vehicle.

2. Description of the Related Art

Conventionally, there is known, as disclosed in Japanese Laid-Open Patent Application No. 2001-194251, a steering apparatus for vehicles which detects an absolute angle of a steering shaft of a vehicle. The steering apparatus comprises a pair of resolver sensors provided to the steering shaft and a multi-rotation absolute detector provided to the steering shaft. The steering apparatus detects an angular position of the steering shaft within a 360°-rotation based on a relationship between output signals of the pair of resolver sensors, and also detects a rotational speed of the steering shaft by using the multi-rotation absolute detector. Therefore, according to the above-mentioned conventional steering apparatus, an absolute angle between a locked position and a locked position of the steering shaft based on the angular position and the rotational speed within a 360°-rotation.

However, in the above-mentioned conventional steering apparatus, since it is necessary to provide the multi-rotation absolute detector to the steering shaft separately from the resolver sensors so as to detect an absolute angle of the steering shaft, a manufacturing cost is increased and a loading space is excessive.

In consideration of this point, it is possible to always detect an angular position of a steering shaft by continuing operations of the resolver sensors and a processing circuit which processes the output signals of the resolver sensors so as to detect an absolute angle of the steering shaft after the ignition key of the vehicle is set to OFF and is pulled out of the keyhole. However, according to such a technique, since an angular position is continuously detected after the ignition key is set to OFF and pulled out of the keyhole, a dark current is increased, which results in a situation where a vehicle battery voltage remarkably drops.

SUMMARY OF THE INVENTION

It is a general object of the present invention to provide an improved and useful steering apparatus of a vehicle in which the above-mentioned problems are eliminated.

A more specific object of the present invention is to provide a steering apparatus of a vehicle, which can achieve detection of an absolute angle of a steering shaft with a simple structure while preventing an increase in power consumption.

In order to achieve the above-mentioned objects, there is provided according to the present invention a steering apparatus for a vehicle comprising: a sensor which outputs an output signal corresponding to an angular position of a steering shaft of the vehicle; and a lock mechanism which restricts rotation of the steering shaft at locking positions provided around the steering shaft at equal intervals, wherein an axial multiplication angle $k\times$ of the output signal of the sensor and a number N of the locking positions provided around the steering shaft satisfy a relationship represented by $k \leq N$.

In above-mentioned invention, since the steering shaft can rotate about the axis thereof by only $360°/N$ when the number of lock locations is N, the steering shaft can rotate within a fixed absolute angle range which includes an absolute angle after the restriction in rotation is permitted. Additionally, when the axial multiple angle of the output signal of the sensor is $k\times$, the sensor outputs a signal of k period while the steering shaft makes one turn (=360°), that is, the sensor outputs the signal having the same level at every $360°/k$. In such a structure, when $k \leq N$ is established, the angel range $(360°/N)$ in which the steering shaft can rotate is equal to or less than the angle range $(360°/k)$ in which the steering shaft does not output signals having the same level. For this reason, signals having the same level are not output from the sensor at a plurality of different angles that are within the angle range in which the steering shaft can rotate. Therefore, the absolute angle of the steering shaft at present time can be detected based on the relationship between a fixed absolute angle range which includes the absolute angle at the time when the restriction in rotation of the steering shaft is permitted and the angular position of the steering shaft detected by using the sensor at present time. In this case, there is no need to provide detectors other than the sensor so as to detect the absolute angle of the steering shaft, and also there is no need to supply an electric power to the sensor and the processing circuit thereof after the restriction in rotation of the steering shaft is permitted and until a detection of the absolute sensor is performed next. For this reason, according to the present invention, the detection of the absolute angle of the steering shaft can be achieved by a simple structure without causing an increase in the power consumption.

The steering apparatus according to the above-mentioned invention may further comprise: angular position detecting means for detecting an angular position of the steering shaft based on the output signal of the resolve sensor; and absolute angle detecting means for detecting an absolute angle of the steering shaft based on a relationship between the absolute angle of the steering shaft at a time a restriction of rotation of the steering shaft by the lock mechanism is permitted and the angular position of the steering shaft detected by the angular position detecting means at a present time.

Additionally, there is provided according to another aspect of the present invention a steering apparatus for a vehicle, comprising: a pair of sensors each of which outputs an output signal corresponding to an angular position of a torsion part of a steering shaft of the vehicle; and a lock mechanism which restricts rotation of the steering shaft at locking positions provided around the steering shaft at equal intervals, wherein axial multiplication angles $m\times$ and $n\times$ ($m>n$) of the output signals of the pair of sensors and a number N of the locking position around the steering shaft satisfy a relationship represented by $(m-n) \leq N$.

In the above-mentioned invention, when the axial multiplication angles of the outputs of the pair of sensors are $m\times$ and $n\times$, respectively, a signal of $(m-n)$ period is output according to the combination of the output signals of the pair of sensors. That is, the signals having the same level are output at every $360°/(m-n)$. In such a structure, when $(m-n) \leq N$ is established, the output signals from the pair of sensors do not have the same level at a plurality of different angles within the angle range in which the steering shaft can rotate. Therefore, the absolute angle of the steering shaft at present time can be detected based on the relationship between a fixed absolute angle range which includes the absolute angle at the time when the restriction in rotation of the steering shaft is permitted and the angular position of the steering shaft detected by using the sensor at present time. For this reason, according to the present invention, the detection of the absolute angle of the steering shaft can be achieved by a simple structure without causing an increase in power consumption.

It should be noted that since a gap is generated between the opposite angular positions of the steering shaft when a torsion is generated in the steering shaft gap, there may occur a case in which the actual angular position and the angular position of the steering shaft detected by using the pair of sensors do not correspond on a one-to-one basis. If such a case happens, the absolute angle of the steering shaft cannot be detected accurately.

However, in the steering apparatus according to the above-mentioned invention, if an allowable torsion angle $\beta$ which is permitted to the torsion part of the steering shaft satisfies a relationship represented by $(360°/n-360°/m)>\beta$, an erroneous detection of the absolute angle due to the torsion of the steering shaft can be prevented since there is no case happens in which the actual angular position and the angular position of the steering shaft detected by using the pair of sensors do not correspond on a one-to-one basis even if a torsion is generated in the steering shaft, for example, in the angle range $\beta$ which is between $-\beta/2$ and $+\beta/2$.

Additionally, the steering apparatus according to the above-mentioned invention may further comprise: angular position detecting means for detecting an angular position of the steering shaft based on the output signals of the pair of sensors; and absolute angle detecting means for detecting an absolute angle of the steering shaft based on a relationship between the absolute angle of the steering shaft at a time when a restriction of rotation of the steering shaft by the lock mechanism is permitted and the angular position of the steering shaft detected by the angular position detecting means at a present time.

Additionally, the steering apparatus according to the above mentioned invention may further comprise key determining means for determining whether or not an ignition key for the vehicle is pulled out of a keyhole, and wherein the lock mechanism may restrict rotation of the steering shaft when the ignition key is pulled out of the keyhole; and the absolute angle detecting means may detect the absolute angle of the steering shaft based on a relationship between the absolute angle of the steering shaft at a time when the ignition key is pulled out the keyhole and the angular position of the steering shaft detected by the angular position detecting means at a present time.

It should be noted that if the determination is continuously made as whether or not the ignition key of the vehicle is pulled out of the keyhole after the ignition key is operated to turn off ignition, the angular position is continuously detected during such a period of time, which results in an increase in the power consumption. Especially, since it is general that a power of a vehicle is stopped after the ignition key is operated to turn off the ignition, such a case may cause a reduction in the vehicle battery voltage.

Accordingly, if the key determining means stops a determining process when a predetermined time has passed after the ignition key is operated to turn off ignition, and thereafter the detection of the absolute angle detecting means is prohibited, such an increase in the power consumption after the ignition-off can be prevented in detecting the absolute angle of the steering shaft.

In the above-mentioned invention, the sensor may be a resolver sensor comprising a resolver stator and a resolver rotor each having a winding. Additionally, the steering shaft may have projections which are provided along an outer surface thereof so as to generate a magnetic field, and the sensor may have a magnetic resistance element of which resistance value changes in response to an intensity of an externally applied magnetic field.

It should be noted, that in the present invention, the "axial multiplication angle" means a signal period per one rotation of an object.

Other objects, features and advantages of the present invention will become more apparent from the following detailed description when read in conjunction of the accompanying drawings.

DETAILED DESCRIPTION OF THE PREFERRED EMBODIMENT

Figure 1:
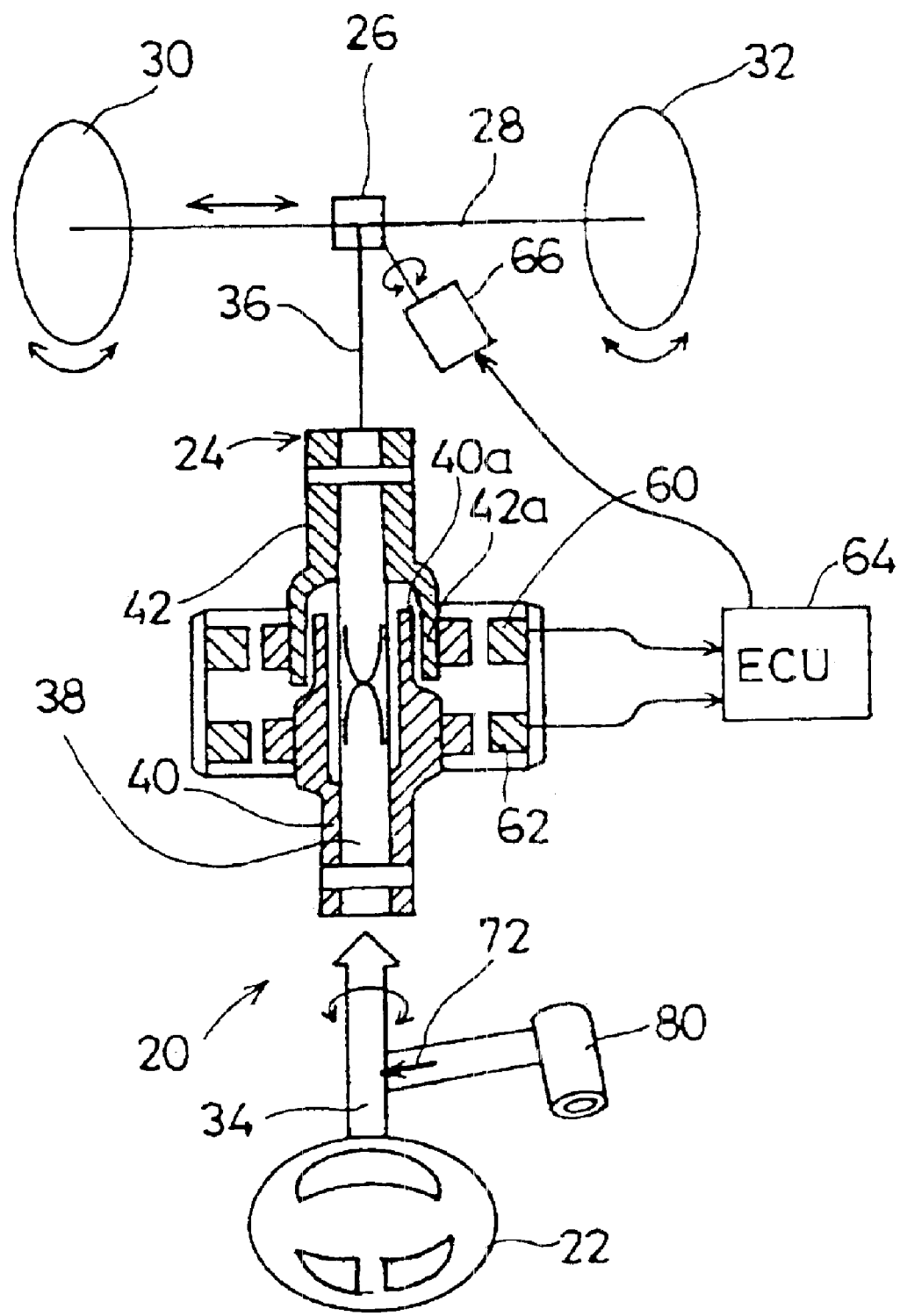
FIG. 1 is a structure diagram of a vehicle steering apparatus according to a first embodiment of the present invention.

FIG. 1 shows a structure diagram of a steering apparatus 20 for vehicles, which is a first embodiment of the present invention. As shown in FIG. 1, the steering apparatus 20 for a vehicle comprises a steering wheel 22 which a driver of the vehicle can operate. The steering wheel 22 is fixed to an end of a steering shaft 24. The steering shaft 24 rotates with rotation of the steering wheel 22. A tie rod 28 is coupled to the other end of the steering shaft 24 through a steering gear box 26. The steering gear box 26 has a function to convert rotational movement of the steering shaft 24 into linear movement of the tie rod 28 in a direction of width of the vehicle. Wheels 30 and 32 are coupled to opposite ends of the tie rod 28 through knuckle arms (not shown). Therefore, the wheels 30 and 32 are steered by the tie rod 28 being moved in the direction of width of the vehicle with rotation of the steering shaft 24.

The steering shaft 24 comprises an input shaft 34 to which a steering wheel 22 is attached, and an output shaft 36 coupled to the tie rod 28. An upper axis 40 and a lower axis 42 are connected to the input shaft 34 and the output shaft 36, respectively. A torsion bar 38 is interposed between the upper axis 40 and the lower axis 42. An end of the torsion bar 38 is fixed to the upper axis 40, and the other end is fixed to the lower axis 42.

The upper axis 40 and the lower axis 42 are provided so that opposing ends 40a and 42a overlap each other in the axial direction. Relative rotation of the upper axis 40 and the lower axis 42 is restricted by a mechanical stopper (not shown in the figure) within a range of a predetermined torsion angle. That is, the torsion angle of the torsion bar 38 is limited by the mechanical stopper within a predetermined range. Hereinafter, it is assumed that the maximum allowable torsion angles in left and right directions that are permitted to the torsion bar 38 are ±β/2 [deg] (the maximum torsion angle is β as a whole).

Figure 2:
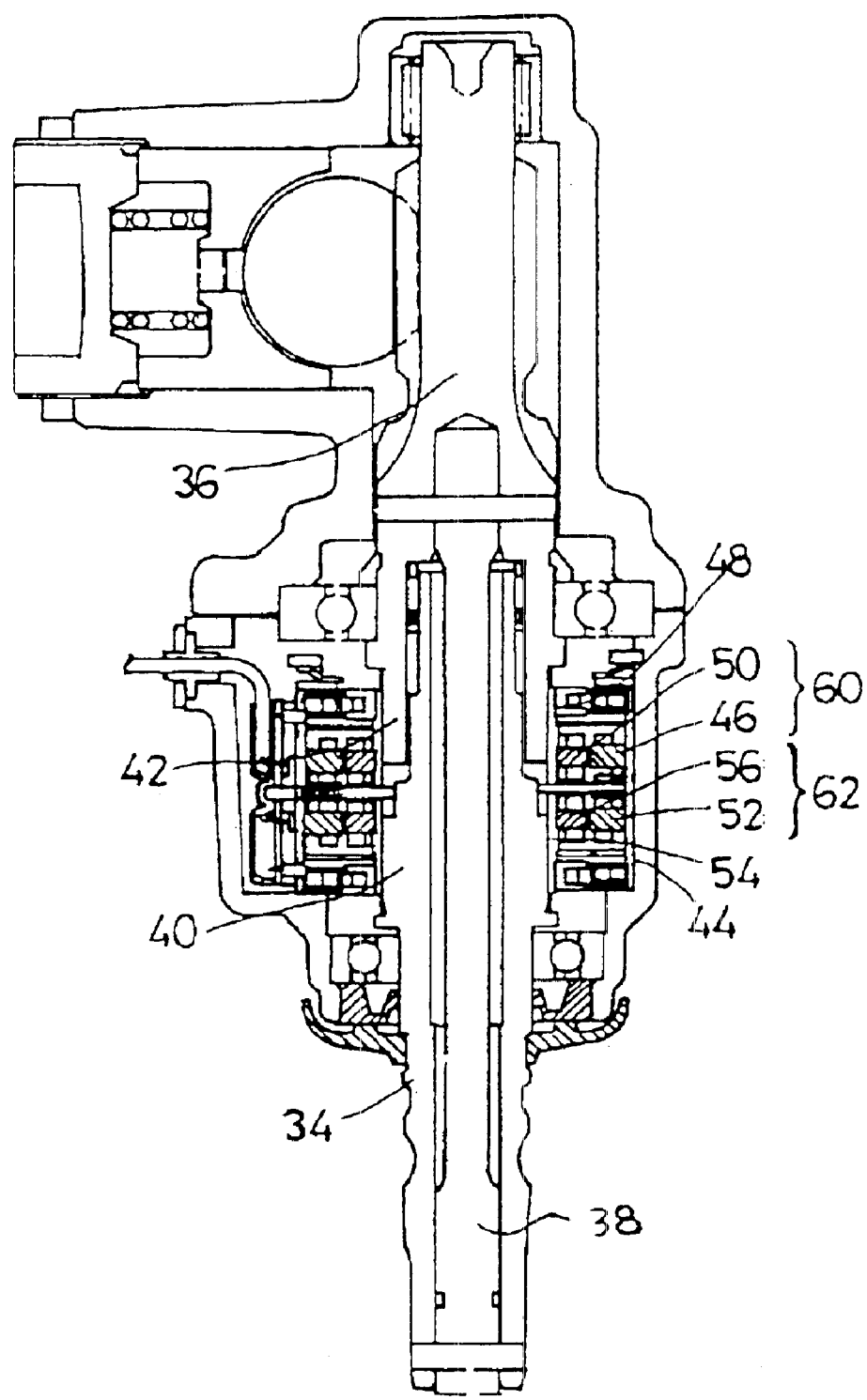
FIG. 2 is a cross-sectional view of a steering shaft shown in FIG. 1.

FIG. 2 shows a cross-sectional view of the steering shaft 24 of the present embodiment. As shown in FIG. 2, a cylindrical case 44 is provided on an outer side of the upper axis 40 and the lower axis 42 so as to enclose the upper axis 40 and the lower axis 42. The case 44 is fixed to a body side of the vehicle. An annular first resolver stator 46 having a rotor winding therein is provided and fixed in the case 44. Additionally, a cylindrical first support member 48 is provided to an outer side of the lower axis 42. The first support member 48 is provided with an annular first resolver rotor 50 having a stator winding so as to face the first resolver stator 46 in a radial direction. Therefore, the first resolver rotor 50 and the first resolver rotor 46 can relatively rotate to each other by rotation of the lower axis 42.

An annular second resolver stator 52 having a rotor winding and adjacent to the first resolver stator 46 is provided and fixed inside the case 44. Additionally, a cylindrical second support member 54 is provided integrally with an outer side of the upper axis 40. The second support member 54 is provided with an annular second resolver rotor 56 which has a stator winding which faces the second resolver stator 52 in a radial direction. Therefore, the second resolver rotor 56 and the second resolver stator 52 can relatively rotate to each other by rotation of the upper axis 40.

In the above-mentioned structure, the positional relationship between the second resolver rotor 56 and the second resolver stator 52 changes with the rotation of the upper axis 40. Moreover, rotation of the lower axis 42 changes the position relation between the 1st resolver rotor 50 and the 1st resolver stator 46 in connection with it. When the positional relationship between the rotor and the stator changes, a magnetic flux passing through the winding changes due to a change in the magnetic resistance. Therefore, the relative angular position between the rotor and the stator can be detected by comparing a phase difference between a sine wave voltage applied to the winding of the rotor and an induced voltage generated in the winding of the stator.

Hereinafter, the sensor which is constituted by the first resolver rotor 50 and the first resolver stator 46 and outputs a signal corresponding to a relative angular position therebetween is referred to as a first resolver sensor 60, and the sensor which is constituted by the second resolver rotor 56 and the second resolver stator 42 and outputs a signal corresponding to a relative angular position therebetween is referred to as a second resolver sensor 62.

The first resolver sensor 60 is constituted so as to output a saw-tooth waveform signal having n cycles (for example, 5 cycles) during a process of one rotation of the lower axis 42 relative to the vehicle body side, that is, a constant level signal for each 360°/n. Therefore, the output signal of the first resolver sensor 60 is a signal of which an axial multiplication angle, which indicates a cycle per one rotation of the lower axis 42, is n×. On the other hand, the second resolver sensor 62 is constituted so as to output a signal having m (>n) cycles (for example, 6 cycles) during a process of one rotation of the upper axis 40 relative to the vehicle body side, that is, a constant level signal for each 360°/m. Therefore, the output signal of the second resolver sensor 60 is a signal of which an axial multiplication angle, which indicates a cycle per one rotation of the upper axis 40, is m×.

As shown in FIG. 1, the first resolver sensor 60 and the second resolver sensor 62 are connected with an electronic control unit (hereinafter, referred to as ECU 64. The output signal of the first resolver sensor 60 and the output signal of the second resolver sensor 62 are supplied to the ECU 64, respectively. The ECU 64 detects a relative angular position of the first resolver rotor 50 and the first resolver stator 46 based on the output signal of the first resolver sensor 60, and detects an angular position theta 1 of the lower axis 42. Additionally, the ECU 64 detects a relative angular position of the second resolver rotor 56 and the second resolver stator 52 based on the output signal of the second resolver sensor 62, and detects an angular position theta 2 of the upper axis 40. Then, the ECU 64 detects a difference between the angular positions θ1 and θ2 (that is, a torsion angle of the torsion bar 38) so as to detect a steering torque (=(torsion angle)×(torsion spring constant)) applied to the steering wheel 22.

The ECU 64 is connected with a motor 66, which is connected to the steering gear box 26. The motor 66 gives an assistance force, which compensates for a displacement of the tie rod 28 in the direction of width of the vehicle due to a rotation of the steering shaft 24 in accordance with an instruction from the ECU 64. That is, the motor 66 generates a torque which compensates for the steering torque of the steering wheel 22 when the wheels 30 and 32 are steered. The ECU 64 drives the motor 66 so as to generate the assistance force corresponding to the detected torsion angle of the torsion bar 38.

Figure 3:
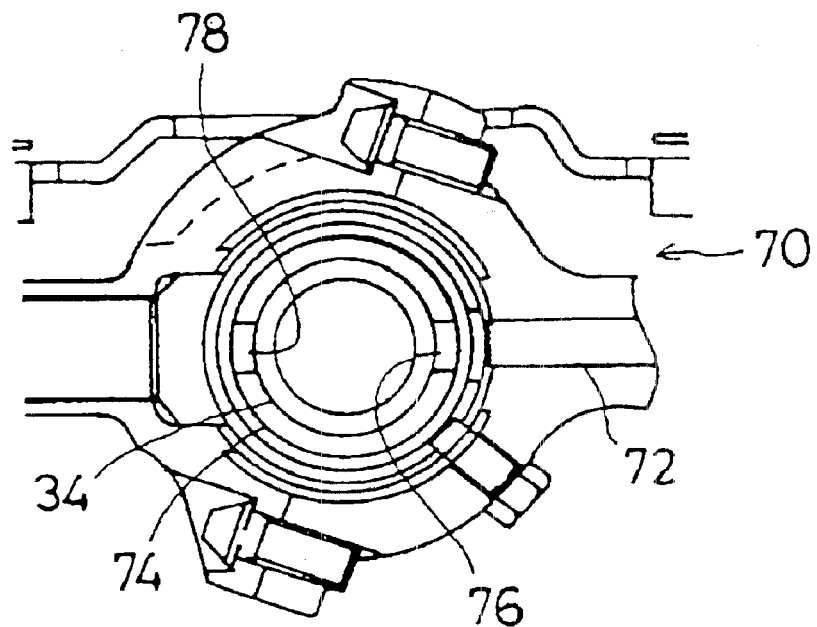
FIG. 3 is a cross-sectional view of a part of a lock mechanism provided in the vehicle steering apparatus according to the first embodiment of the present invention.
Figure 4:
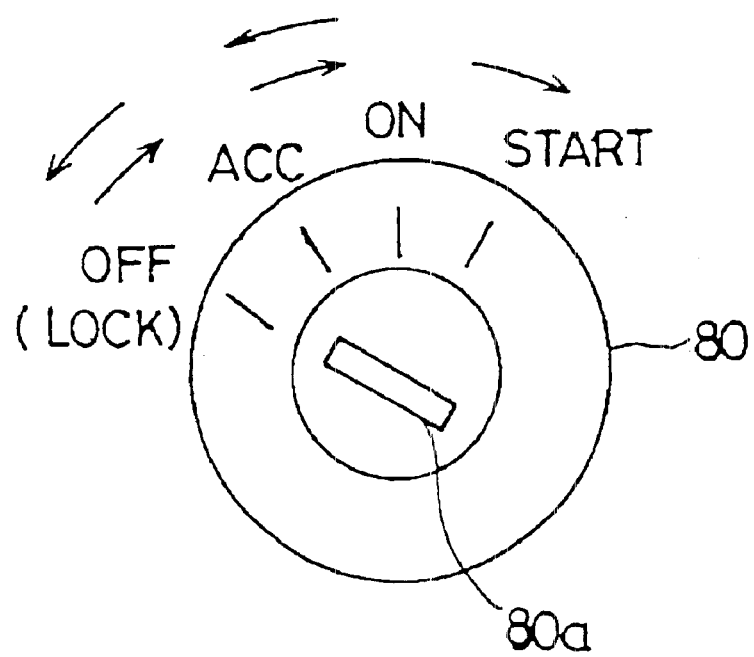
FIG. 4 is an illustration of a key cylinder into which an ignition an ignition key of a vehicle relating to the first embodiment is inserted.

FIG. 3 shows a cross-sectional view of a part of a lock mechanism provided in the vehicle steering apparatus 20 according to the present embodiment. Additionally, FIG. 4 is an illustration of a key cylinder into which an ignition an ignition key of a vehicle relating to the present embodiment is inserted. The vehicle steering apparatus 20 is provided with the lock mechanism 70, which controls rotation of the steering shaft 24. The lock mechanism 70 comprises a lock bar 72 which is arranged on the vehicle body side and extends in a radial direction of the input shaft 34, and N lock holes (two in FIG. 3) 76 and 78 which are provided to a lock holder 74 integrally rotated with the input shaft 34.

The lock bar 72 is constituted so as to be reciprocable in the radial direction of the input shaft 34. When the lock bar 72 can be moved toward the axial center of the input shaft 34 after a change is made from a state where the ignition key of the vehicle is inserted into the keyhole 80a of the key cylinder 80 to a state where the ignition key can be pulled out of the keyhole 80a. On the other hand, after the ignition key is inserted into the keyhole 80a and then operated from an IG OFF state to an ACC state, the lock bar 72 is not permitted to protrude toward the axial center of the input shaft 34.

Moreover, the lock holes 76 and 78 are arranged at equal intervals around the input shaft 34. In the present embodiment, the number of the lock holes 76 and 78 is two, specifically, the lock holes 76 and 78 are provided at locations opposite to each other with respect to the axial center of the input shaft 34, that is, at locations 180 degrees different from each other in a circumference direction of the input shaft 34. Both the lock holes 76 and 78 have a diameter larger than a diameter of the lock bar 72 so that the lock bar 72 can be inserted therein.

In the lock mechanism 70, if the lock holes 76 and 78 of the input shaft 34 do not oppose the lock bar 72 in a radial direction even when the lock bar 72 can protrude toward the axial direction of the input shaft 34, the lock bar 72 does not protrude and is not inserted into the lock holes 76 and 78. In this case, rotation of the input shaft 34 is not restricted. On the other hand, under such a situation, when the lock holes 76 and 78 counter the lock bar 72 in the radial direction due to a rotational operation of the input shaft 34, the lock bar 72 protrudes and is inserted into the lock holes 76 and 78. In this case, rotation of the input shaft 34 is restricted. Additionally, under the situation that the lock bar 72 protrudes toward the axis of the input shaft 34, when the ignition key shifts to the ACC state from the IG OFF state, the lock bar 72 retreats from the lock holes 76 and 78, and moves so as to separated from the central axis of input shaft 34.

As mentioned-above, N lock holes 76 and 78 are provided at equal intervals. For this reason, after the ignition key is set to TG OFF and pulled out of the keyhole 80a, the rotation of the input shaft 24 is positively restricted by the lock mechanism 70 when the steering wheel 22 is rotated by a maximum of 360°/N. Specifically, since the lock holes 76 and 78 are provided at two positions different by 180° in the circumferential direction of the input shaft 34 in the present embodiment, if the steering wheel 22 is rotated by the maximum of 180° after the ignition key is pulled out of the keyhole 80a, the rotation of the input shaft 34 is positively restricted.

In the mean time, since an axial multiplication angle of the output signal of the first resolver sensor 60 is n× and an axial multiplication angle of the output signal of the second resolver sensor 62 is m×, the output difference between both signals corresponds to every 360°/(m−n) of the angular position of the steering shaft 24. Therefore, the ECU 64 can detect the angular position θ for every 360°/(m−n) of the steering shaft 24 based on the difference of the outputs of the first resolver sensor 60 and the second resolver sensor 62.

However, it is difficult to detect the absolute angle δ between the lock and lock of the steering shaft 24 (the neutral position of the steering axis 24 is set to a position of δ=0, δ>0 in right steering, δ<0 in left steering) only with the above-mentioned structure. Namely, if the ECU 64 is in the state of power ON after the IG OFF of the ignition key, the absolute angle δ of the steering shaft 24 can be detected by continuously monitoring the output signals of the first and second resolver sensors 60 and 62, however, with such a structure, the monitor of the output signals of the first and the second resolver sensors 60 and 62 are always carried out, which increases a dark current due to the continuous operation of the ECU 64 after the ignition key is set to IG off and a power consumption is increased. Moreover, if it can be judged whether the vehicle is in the state of straight movement by using a sensor which detects a wheel speed or a sensor which detects a yaw acceleration under a situation that the vehicle is actually moving, the absolute angle δ of the steering shaft 24 can be detected by detecting the output signals of the first and second resolver sensors 60 and 62 under the straight movement, however, with such a structure, the absolute angle δ cannot be detected immediately after the ignition key changes from the IG OFF state to the ACC state.

Then, it is a feature of the present embodiment that the absolute angle δ of the steering shaft 24 is detected without using detectors other than the first and second resolver sensors 60 and 62 so that there is no inconvenience occurs as mentioned above. A description will be given below of the feature with reference to FIGS. 5 through 11.

In the present embodiment, the lock mechanism restricts the rotation of the input shaft 34 (that is, the steering shaft 24) when the steering wheel is rotated by 360°/N at the maximum under the situation where the ignition key is pulled out of the keyhole 80a. For this reason, after the ignition key is pulled out of the keyhole 80a, the absolute angle δ, which the steering shaft 24 can achieve, is restricted within a range of 360°/N which includes the absolute angle at which the ignition key is pulled out of the keyhole 80a. Additionally, in the present embodiment, the ECU 64 can detect the angular position θ of every 360°/(m−n) of the steering shaft 24 as mentioned above.

Figure 5:
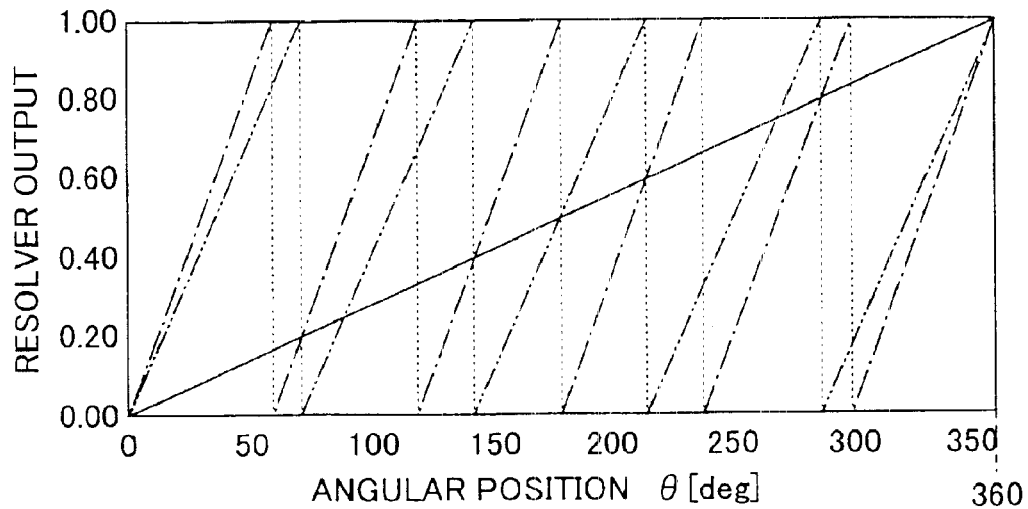
FIG. 5 is a graph showing a relationship between an angular position θ of the steering shaft and resolver outputs in a case where axial multiplication angles of the output signals of a pair of resolver sensors are 5× and 6×, respectively.
Figure 6:
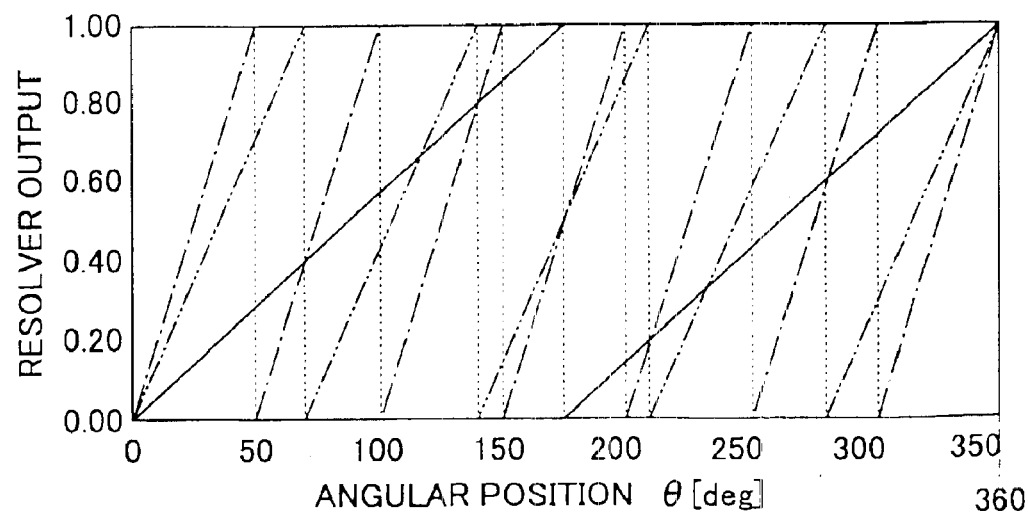
FIG. 6 is a graph showing a relationship between the angular position of the steering shaft and resolver outputs in a case where the axial multiplication angles of the output signals of the pair of resolver sensors are 5× and 7×, respectively.

FIG. 5 is a graph showing a relationship between the angular position θ of the steering shaft 24 and resolver outputs in a case where the axial multiplication angles of the output signals of the first and second resolver sensors 60 and 62 are 5× and 6× (m=6, n=5), respectively. Additionally, FIG. 6 is a graph showing a relationship between the angular position θ of the steering shaft 24 and resolver outputs in a case where the axial multiplication angles of the output signals of the first and second resolver sensors 60 and 62 are 5× and 7× (m=7, n=5), respectively. It should be noted that in FIG. 5 and FIG. 6, the output signals of the first and second resolver sensors 60 and 62 are indicated by a single-dashed chain line and a double-dashed chain line, respectively, and a difference between the output signals is indicated by a solid line.

Since m−n=1 is established when the axial multiplication angle of the output signals of the first and second resolver sensors 60 and 62 are 5× and 6×, respectively as shown in FIG. 5, the angular position θ can be detected at every 360°-rotation of the steering shaft 24 by the ECU 64. In this case, the output difference of the pair of signals corresponds the angular position of the steering shaft one by one at every 360°-rotation. Additionally, if one lock hole of the lock mechanism 70 is provided around the input shaft 34, after the ignition key is pulled out of the keyhole 80a, the absolute angle δ, which the steering shaft 24 can achieve, is restricted within a range of 360° including the absolute angle when the ignition key is pulled out of the keyhole 80a. In this case, after the ignition key is pulled out of the keyhole 80a, the steering shaft 24 cannot be rotated more than 360°.

Therefore, in a case where the difference (=m−n) between the axial multiplication angles of the output signals of the resolver sensors 60 and 62 is 1, if one lock hole of the lock mechanism 70 is provided around the steering shaft 24, by setting an angle range of 360° which is permitted to the steering shaft 24 and includes the stored absolute angle based on the absolute angle of the steering shaft 24 when the ignition key is pulled out of the keyhole 80a (for example, 0°≦δ<360° when the stored absolute angle is 120°, 360°≦δ<720° when the stored absolute angle is 400°, −360°≦δ<0° when the stored absolute angle is −230°), the absolute angle δ of the steering shaft 24 can be uniquely detected from a relationship between the setting angle range and the angular position at every 360°-rotation of the setting shaft 24 which is detected based on the output difference between the outputs of the pair of resolver sensors 60 and 62. It should be noted that even if more than two lock holes of the lock mechanism are provided around the steering shaft 24, the absolute angle δ of the steering angle can be uniquely detected.

Additionally, since m−n=2 is established when the axial multiplication angle of the output signals of the first and second resolver sensors 60 and 62 are 5× and 7×, respectively as shown in FIG. 6, the angular position θ can be detected at every 180°-rotation of the steering shaft 24 by the ECU 64. In this case, the output difference of the pair of signals corresponds the angular position of the steering shaft one by one at every 180°-rotation. If only one lock hole of the lock mechanism 70 is provided around the input shaft 34 when the difference (m−n) between the axial multiplication angles of the output signals of the pair of the resolver sensors 60 and 62 is 2, there is a case in which the steering shaft 24 is rotated more than 180° after the ignition key is pulled out of the keyhole 80a. Therefore, if a angle range of 360 which includes the absolute angle of the steering shaft 24 when the ignition key is pulled out and which is permitted to the steering shaft is set, the absolute angle δ cannot be detected uniquely in accordance with the relationship between the setting angle range and the angular position range θ at every 180°-rotation of the steering shaft 24 detected based on the output difference between the pair of resolver sensors 60 and 62. For example, although the range of the absolute angle permitted for the steering shaft 24 is 0°≦δ<360° when the stored absolute angle is 50°, it cannot be determined whether the absolute angle of the steering shaft 24 is in the range of 0°≦δ<180° or in the range of 180°≦δ<360° since the output difference between the pair of resolver sensors 60 and 62 is at the same level at every 180°-rotation. Thus, the absolute angle δ of the steering shaft 24 cannot be detected.

On the other hand, if two lock holes of the lock mechanism 70 are provided around the input shaft 34, after the ignition key is pulled out of the keyhole 80a, the absolute angle δ, which the steering shaft 24 can achieve, is restricted within a range of 180° including the absolute angle when the ignition key is pulled out of the keyhole 80a. In this case, after the ignition key is pulled out of the keyhole 80a, the steering shaft 24 cannot be rotated more than 180°. Therefore, in a case where the difference between the axial multiplication angles is 2, if two lock holes of the lock mechanism 70 is provided around the steering shaft 24, by setting an angle range of 180° which is permitted to the steering shaft 24 and includes the stored absolute angle based on the absolute angle of the steering shaft 24 when the ignition key is pulled out of the keyhole 80a (for example, 0°≦δ<180° when the stored absolute angle is 120°, 360°≦δ<540° when the stored absolute angle is 400°, −360°≦δ<180° when the stored absolute angle is −230°), the absolute angle δ of the steering shaft 24 can be uniquely detected from a relationship between the setting angle range and the angular position at every 180°-rotation of the setting shaft 24 which is detected based on the output difference between the outputs of the pair of resolver sensors 60 and 62. It should be noted that even if more than three lock holes of the lock mechanism are provided around the steering shaft 24, the absolute angle δ of the steering angle can be uniquely detected.

As mentioned above, if the relationship between the difference (=m−n) between the axial multiplication angles n× and m× of the output signals of the resolver sensors 60 and 62 and the number N of the lock holes provided around the input shaft 34 at equal intervals satisfies the following equation (1), the allowable angle range (=360°/N) of the rotation of the steering shaft 24 when the rotation by the lock mechanism 70 is restricted is less than the angle range (=360°/(n−m)) where the output differences of the pair of resolver sensors 60 and 62 is not at the same revel. In this case, the output differences of the pair of resolver sensors 60 and 62 cannot be at the same level at a plurality of different angles within the angle range in which the rotation of the steering shaft 24 is permitted, and, thereby, the absolute angle of the steering shaft 24 can be uniquely detected.

$$(m-n) \leq N \tag{1}$$

Additionally, in the present embodiment, since the steering shaft 24 has the torsion bar 38, there is a case in which the absolute angle of the lower axis 42 and the absolute angle of the upper axis 40 so not match each other. In such a case, the difference between the absolute angles fluctuates within a range between the maximum torsion angles −β/2 and +β/2 of the torsion bar 38. A description will be given below of a case in which the absolute angle of the steering shaft 24 is detected.

Figure 7:
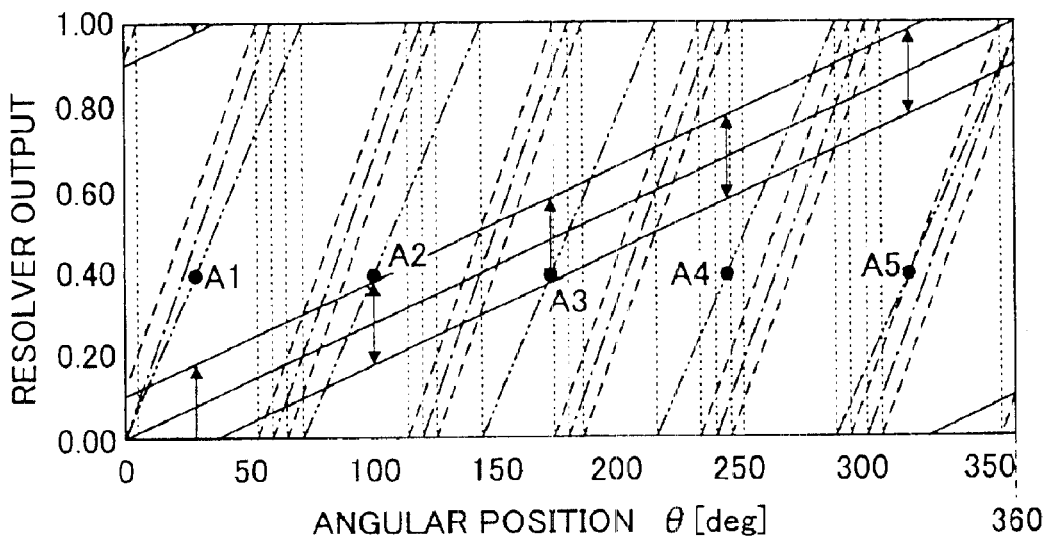
FIG. 7 is a graph showing a relationship between the angular position of the steering shaft and resolver outputs in a case where a torsion of ±6° occurs in the steering shaft when the axial multiplication angles of the output signals of the pair of resolver sensors are 5× and 6×, respectively.
Figure 8:
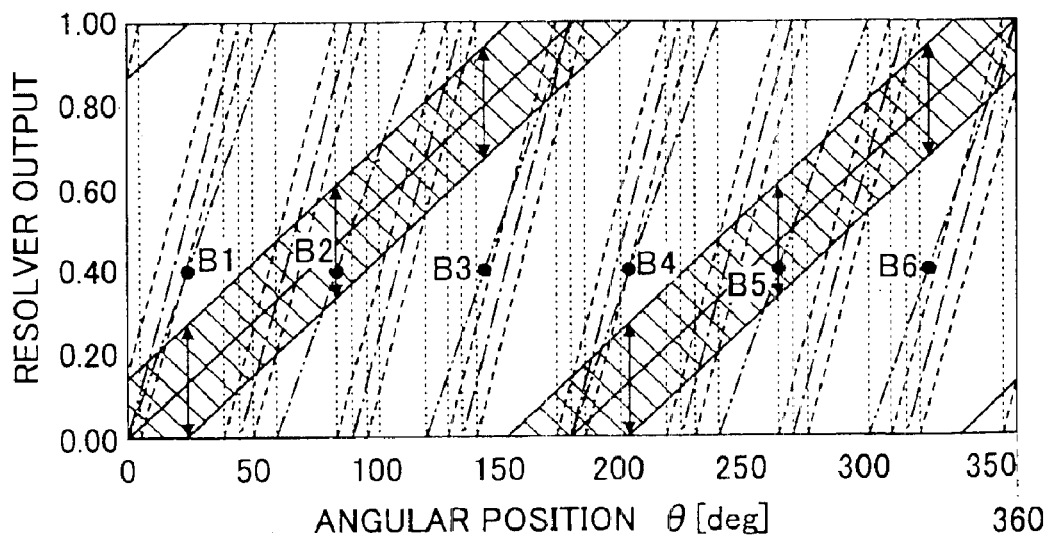
FIG. 8 is a graph showing a relationship between the angular position of the steering shaft and resolver outputs in a case where a torsion of ±6° occurs in the steering shaft when the axial multiplication angles of the output signals of the pair of resolver sensors are 6× and 8×, respectively.

FIG. 7 is a graph showing a relationship between the angular position θ of the steering shaft 24 and resolver outputs in a case where the axial multiplication angles of the output signals of the first and second resolver sensors 60 and 62 are 5× and 6×, respectively, and the maximum torsion angle β/2 of the torsion bar 38 is ±6°. FIG. 8 is a graph showing a relationship between the angular position θ of the steering shaft 24 and resolver outputs in a case where the axial multiplication angles of the output signals of the first and second resolver sensors 60 and 62 are 6× and 8×, respectively, and the maximum torsion angle β/2 of the torsion bar 38 is ±6°. Additionally, FIG. 9 is a graph showing a relationship between the angular position θ of the steering shaft 24 and resolver outputs in a case where the axial multiplication angles of the output signals of the first and second resolver sensors 60 and 62 are 6× and 8×, respectively, and the maximum torsion angle β/2 of the torsion bar 38 is ±7.5°.

Figure 9:
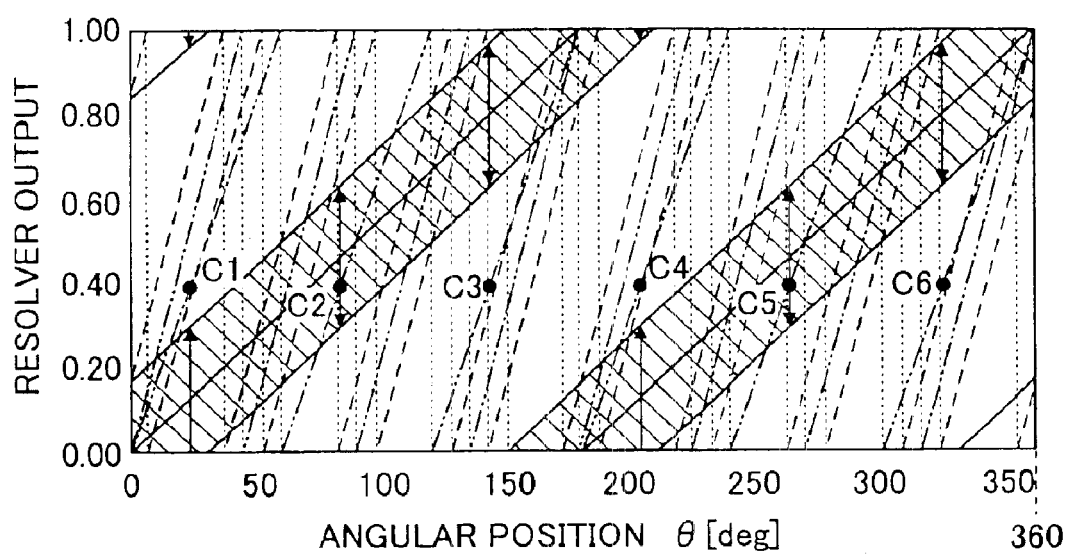
FIG. 9 is a graph showing a relationship between the angular position of the steering shaft and resolver outputs in a case where a torsion of ±7.5° occurs in the steering shaft when the axial multiplication angles of the output signals of the pair of resolver sensors are 6× and 8×, respectively.

It should be noted that, in FIG. 7 through FIG. 9, the output signal of the first resolver sensor 60 is indicated by double-dashed chain lines. The output signal of the second resolver sensor 62 in the case where a torsion is not generated in torsion bar 38 is indicated by single-dashed chain lines, the output signal of the second resolver sensor 62 in the case where the upper axis 40 is twisted to the left steering side and the right steering side relative to the lower axis 40 by the maximum torsion angle β/2 is indicated by dashed lines, and the range in which the difference between the output signals of the first and second resolver sensors 60 and 62 can fall including the case where the torsion is generated in the torsion bar 38 as mentioned above is indicated by hatched areas.

In the case shown in FIG. 7 where the axial multiplication angles of the output signals of the pair of resolver sensors 60 and 62 are 5× and 6×, respectively, and the maximum torsion angle β/2 of the torsion bar 38 is ±6°, the output difference of the resolver sensors 60 and 62 appears within the hatched area. For example, when the output signal of the first resolver sensor 60 is 0.4, θ≈30, 102, 174, 246 and 318 are extracted as candidates of the angular position θ at every 360°-rotation (indicated by points A1, A2, A3, A4 and A5 in FIG. 7). However, in such a structure, there is a portion in which the range (range indicated by solid arrows) of the output difference of the pair of resolver sensors 60 and 62 with respect to each candidate overlaps with the adjacent range of the candidate due to the torsion of the torsion bar 38. For example, since the lower limit (under the solid arrows) of the output difference with respect to the point 2 is greater than the upper limit (above the solid arrows) of the output difference with respect to the point A1, there may be a case in which the angular positions θ at every 360°-rotation of the steering axis 24 detected based on the output difference of the pair of resolver sensors 60 and 62 do not correspond to the actual angular positions in one-to-one relationship. For this reason, the detection of the absolute angle δ of the steering shaft 24 cannot be performed accurately.

On the other hand, in the case shown in FIG. 8 where the axial multiplication angles of the output signals of the pair of resolver sensors 60 and 62 are 6× and 8×, respectively, and the maximum torsion angle β/2 of the torsion bar 38 is ±6°, the output difference of the resolver sensors 60 and 62 appears within the hatched areas. For example, when the output signal of the first resolver sensor 60 is 0.4, θ≈25, 85 and 145 or θ=205, 265 and 325 are extracted as candidates of the angular position θ at every 180°-rotation (indicated by points B1, B2, B3, B4, B5 and B6 in FIG. 8). In such a structure, it can be avoided that the range (range indicated by solid arrows) of the output difference of the pair of resolver sensors 60 and 62 with respect to each candidate overlaps with the adjacent range of the candidate due to the torsion of the torsion bar 38. Thereby, there is no case in which the angular positions θ at every 180°-rotation of the steering axis 24 detected based on the output difference of the pair of resolver sensors 60 and 62 do not correspond to the actual angular positions in one-to-one relationship. Thus, the detection of the absolute angle δ of the steering shaft 24 can be performed accurately.

Additionally, in the case shown in FIG. 9 where the axial multiplication angles of the output signals of the pair of resolver sensors 60 and 62 are 5× and 6×, respectively, similar to the case shown in FIG. 8, and the maximum torsion angle β/2 of the torsion bar 38 is ±7.5°, the output difference of the resolver sensors 60 and 62 appears within the hatched areas. For example, when the output signal of the first resolver sensor 60 is 0.4, θ≈25, 85 and 145 or θ=205, 265 and 325 are extracted as candidates of the angular position θ at every 180°-rotation (indicated by points C1, C2, C3, C4, C5 and C6 in FIG. 9). However, in such a structure, there is a portion in which the range (range indicated by solid arrows) of the output difference of the pair of resolver sensors 60 and 62 with respect to each candidate overlaps with the adjacent range of the candidate due to the torsion of the torsion bar 38, and thus, similar to the case shown in FIG. 7, the detection of the absolute angle δ of the steering shaft 24 cannot be performed accurately.

Thus, if an overlapping portion is present in the range in which the output difference of the pair of resolver sensors 60 and 62 falls with respect to the adjacent candidates due to the torsion of the torsion bar 38, that is, if the maximum value (when the maximum torsion angle +β/2 is generated in the torsion bar 38) and the minimum value (when the maximum torsion angle −β/2 is generated in the torsion bar 38) are included in the range which can be taken by the adjacent candidate, the absolute angle δ of the steering shaft 24 may be erroneously detected.

On the other hand, if there is no overlapping portion with respect to the adjacent candidate in the range which can be taken by the output difference of the pair of resolver sensors 60 and 62, that is, if the maximum value and the minimum value are not included in the range which can be taken by the adjacent candidate, the absolute angle δ of the steering shaft 24 can be accurately detected.

In order for the overlapping portion not to exist with respect to the adjacent candidate in the range which the output difference of the pair of resolver sensors 60 and 62 can take, it is sufficient as indicated by the following equation (2) that an angle of a sum of the angle period (=360°/m) at the reference time of the output signal (larger one of the axial multiplication angles; m) of the second resolver sensor 62 and the maximum torsion angle β as a whole which is a sum of the left and right maximum torsion angles ±β/2 of the torsion bar 38 does not reach the angle period (360°/n) of the output signal (smaller one of the axial multiplication angles; n) of the first resolver sensor 60.

$$360°/m + \beta < 360°/n \tag{2}$$

Namely, if a torsion is generated in the torsion bar 38 in the range of the maximum torsion angle ±β/2 in left and right, specifically, if the upper axis 40 is twisted relative to the lower axis 42 in the range of the maximum torsion angle ±beta/2 in left and right, the output signal of the second resolver sensor 62 varies in response to the torsion, which results in the phase of the output signal of the second resolver sensor 62 being shifted by the maximum torsion angle δ at the maximum as a whole.

In this case, in a structure in which the above-mentioned equation (2) is not satisfied, the range, which can be taken by the pair of resolver sensors 60 and 62 and determined by the output signal of the second resolver sensor 62 with respect to each candidate of the angular position θ of the steering shaft 24 detected at every 360°-rotation by the output signal of the first resolver sensor 60, may overlap with the range which can be taken by the output difference with respect to the adjacent candidate. On the other hand, in a structure in which the above-mentioned equation (2) is satisfied, that is, in a structure in which the above-mentioned equation (3) is established, if a torsion is generated in the torsion bar 38 in the range of the maximum torsion angle ±β/2 in left and right, it can be avoided that the range, which can be taken by the pair of resolver sensors 60 and 62 and determined by the output signal of the second resolver sensor 62 with respect to each candidate of the angular position θ of the steering shaft 24 detected at every 360°-rotation by the output signal of the first resolver sensor 60, overlaps with the range which can be taken by the output difference with respect to the adjacent candidate.

$$(360°/n − 360°/m) > \beta \tag{3}$$

Thus, in the present embodiment, the axial multiplication angles n× and m× of the output signals of the pair of resolver sensors 60 and 62 and the number N of the lock holes of the lock mechanism 70 are set so as to satisfy the above-mentioned equation (1), and the axial multiplication angles nx and mx and the maximum torsion angle of the torsion bar 38 as a whole are set so as to satisfy the above-mentioned equation (2) (that is, equation (3)). According to such a structure, the absolute angle δ of the steering shaft 24 can be detected and at the same time the detection of the absolute angle δ can be performed accurately.

Figure 10:
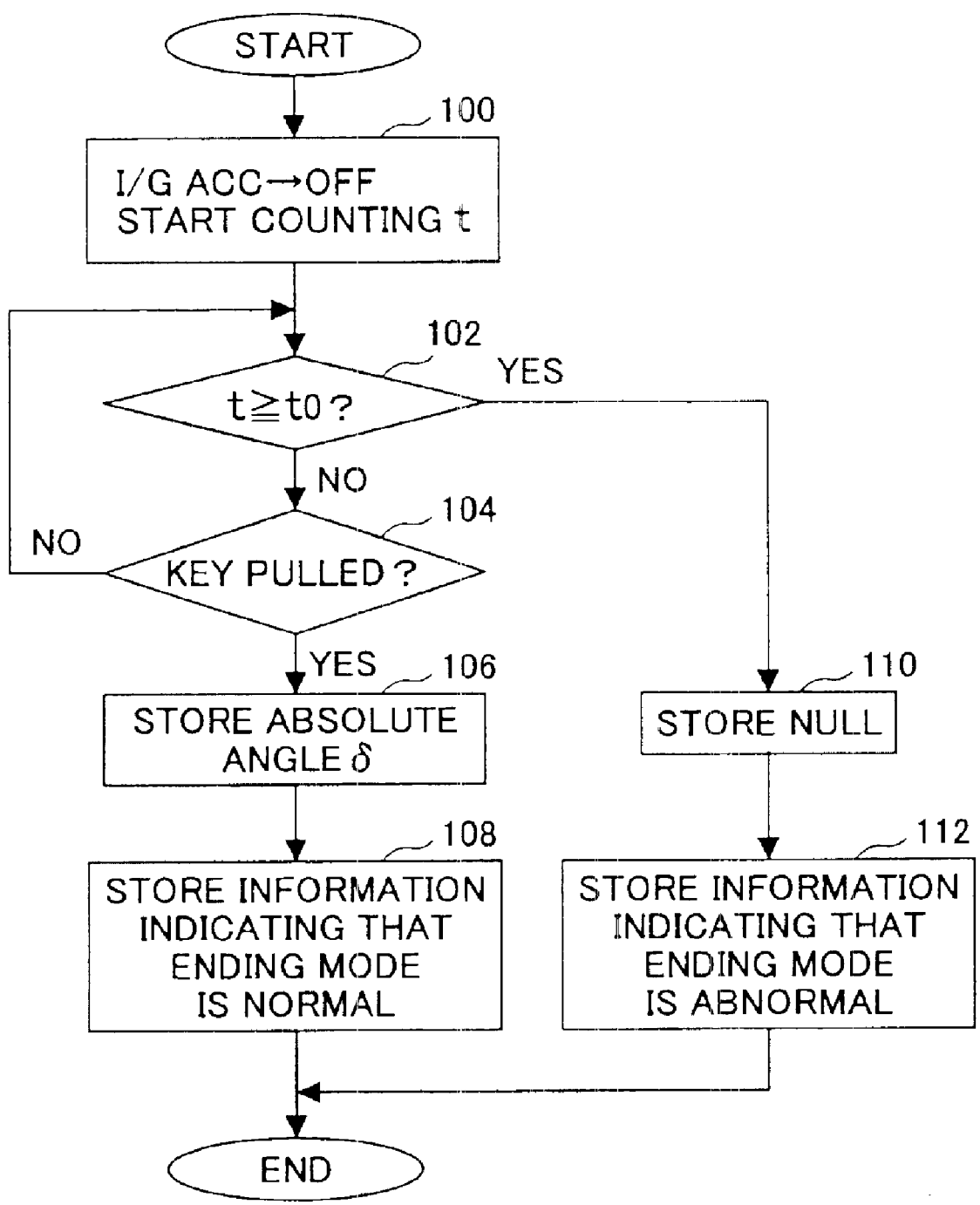
FIG. 10 is a flowchart of a control routine performed during an ignition-on state in the embodiment.
Figure 11:
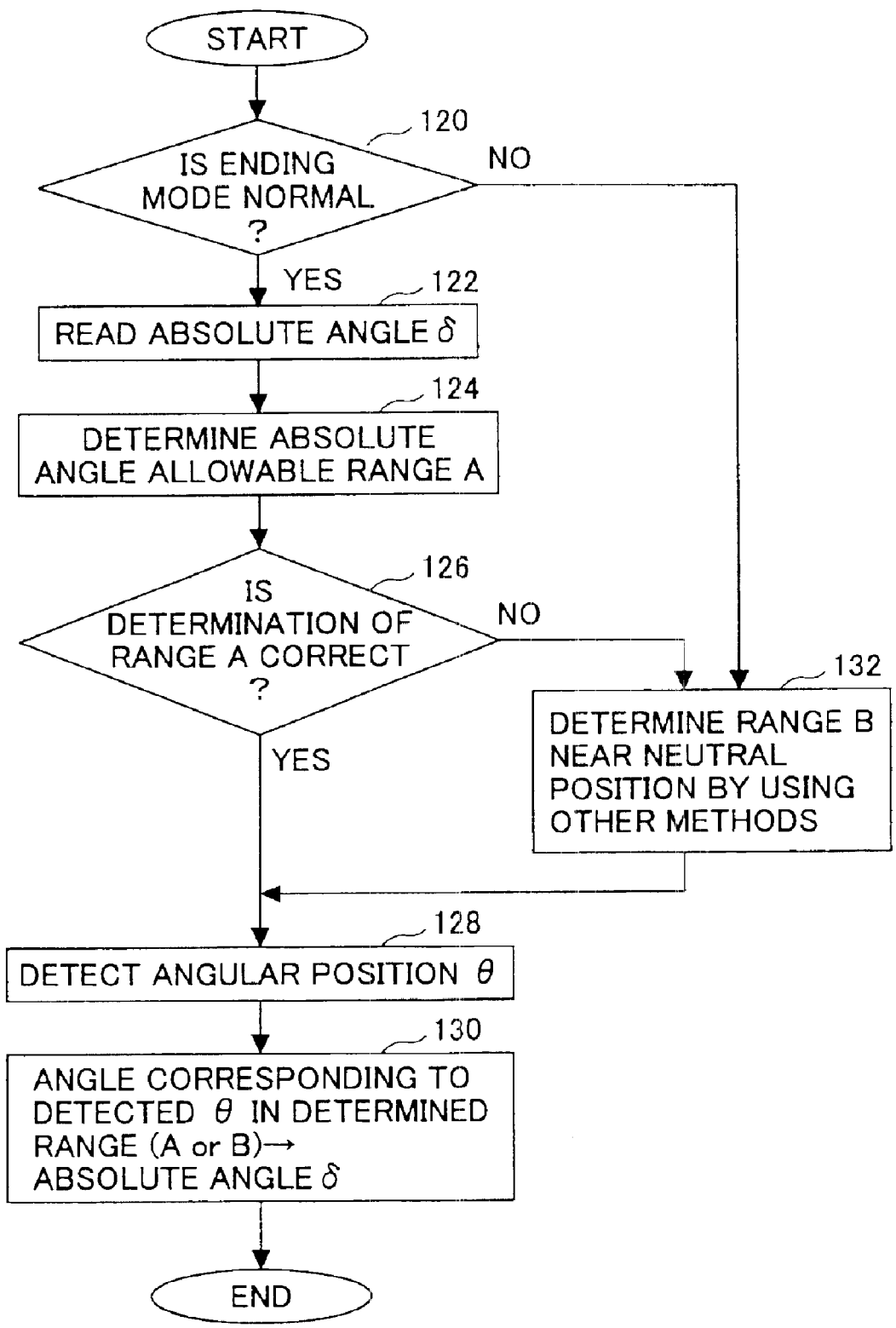
FIG. 11 is a flowchart of a control routine performed during an ignition-on state in the embodiment.

FIG. 10 and FIG. 11 show flowcharts of examples of control routines performed by the ECU 64 when the ignition key is set to an IG OFF state and an ACC ON state so as to detect an absolute angle δ of the steering shaft 24 in the present embodiment. The routine shown in FIG. 10 is started each time the ignition key is shifted to the IG OFF state from the ACC state. When the routine shown in FIG. 10 is started, the process of step 100 is performed first.

In step 100, a process for starting the count of time t when the ignition key shifts from the ACC state to the IG OFF state.

In step 102, it is determined whether or not the time t, of which counting has been started in the above-mentioned step 100, reached a predetermined time t0. It should be noted that the predetermined time t0 is set to a minimum time t by which an increase in a dark current can be determined to be remarkable after the ignition key is turned to the IG OFF state in the process of storing an absolute angle δ of the steering shaft 24 when the ignition key is pulled out of the keyhole 80a. When t≧t0 is not established, it can be determined that the dark current has not been increased remarkably after the turning off the ignition, and, thus, it can be determined that it is a time to continue the process of storing the absolute angle δ of the steering shaft 24. Accordingly, if it is determined that t≧t0 is not established, the process of step 104 is performed next.

In step 104, it is determined whether or not the ignition key is pulled out of the keyhole 80a. This determination is performed using, for example, an existing sensor which detects an operational position of the ignition key. As a result, when the determination is negative, it is not a state where the lock lever 72 of the lock mechanism 70 is not able to protrude toward the axial center of the input shaft 34, and, thus, the steering shaft 24 can be rotated from lock to lock. Accordingly, the process subsequent to the above-mentioned step 102 is carried out repeatedly until the protrusion of the lock lever 72 is permitted. When an affirmative determination is made in step 104, it is in the state where the lock bar 72 can protrude, and since the rotation of the steering shaft 24 is restricted within a predetermined range, the process of step 106 is performed next.

In step 106, the absolute angle δ which is detected at the time the process of step 106 is performed is stored in a non-volatile memory. Then, in step 108, a process of storing information in the non-volatile memory is performed, the information indicating that the ending mode when the ignition key is pulled out of the keyhole 80a is normal. After the process of step 108 is completed, the routine is ended.

On the other hand, when t≧t0 is established in the above-mentioned step 104, it can be determined that the dark current increased remarkably after ignition is turned off, and it can be determined it is the time to stop the storing process of the absolute angle δ of the steering shaft 24. Therefore, when such a determination is made, the process of step 110 is performed next.

In step 110, a process of storing information in the non-volatile memory is performed, the information indicating that there is no absolute angle δ of the steering shaft 24 which is to be stored. Then, in step 112, a process of storing information in the non-volatile memory is performed, the information indicating that the ending mode when the ignition key is pulled out of the keyhole 80a is abnormal. After the process of step 112, the routine is ended.

According to the routine shown in FIG. 10, when the ignition key of the vehicle is pulled out of the keyhole 80a, that is, when the restriction for the steering shaft 24 by the lock mechanism 70 is permitted, the absolute angle δ of the steering shaft 24 can be stored in the memory. At this time, since the absolute angle δ of the steering shaft is stored in the non-volatile memory of the ECU 64, the absolute angle is maintained even when the poser of the ECU 64 is once turned off and again turned on.

The routine shown in FIG. 11 is started each time the ignition key is shifted from the IG OFF state to the ACC state. When the routine shown in FIG. 11 started, the process of step 120 is performed first.

In step 120, it is determined whether the ending mode is normal or abnormal, the ending mode being stored in the non-volatile memory when the ignition key is shifted from the TG OFF state to the ACC state. Consequently, if it is determined that the ending mode is normal, the process of step 122 is performed next.

In step 122, a process of reading the stored absolute angle δ, which is stored in the non-volatile memory, is performed. Then, in step 124, a process of specifying or determining a range A is performed as a range of the absolute angle which the steering shaft 24 of which restriction of rotation by the lock mechanism 70 is released can achieve, the range A corresponding to an interval (=360°/N) of the lock holes around the steering shaft 24 which includes the stored absolute angle δ read in the above-mentioned step 122.

It is determined, in step 126, whether or not the range A determined in the above-mentioned step 124 is correct in accordance with consistency with, for example, a wheel speed, a yaw acceleration or a steering torque acquired by existing sensors. Consequently, if an affirmative determination is made, the process of step 128 is performed next.

In step 128, a process for detecting an angular position θ of the steering shaft 24 at every 360°/(m−n) is performed based on the output difference of the output signals supplied from the first and second resolver sensors 60 and 62 at the time of processing of step 128.

In step 130, a process of setting an angle corresponding to the angular position θ detected in step 128 as the absolute angle of the steering shaft 24 is performed within the range A of the absolute angle which has been determined in step 124 and can be achieved by the steering shaft 24 restricted by an operation of the lock mechanism 70 or within a range B of the absolute angle which is determined in step 132 mentioned later and can be achieved by the steering shaft 24. After the execution of the process of step 130, other processes such as a computation of an assistance force by the motor 66 are progressed based on the set angle as the absolute angle of the steering shaft 24. When the process of step 130 is completed, the routine is ended.

On the other hand, if a negative determination is made in step 120 or a negative determination is made in step 126, the absolute angle δ of the steering shaft 24 cannot be detected by using the above-mentioned method which is based on the relationship between the lock mechanism 70 and the output signals of the pair of resolver sensors 60 and 62, and the process of step 132 is performed next.

In step 132, a process for specifying the range B near the neutral position of the steering shaft 24 is performed in accordance of existence of a straight movement of the vehicle which can be determined by using, for example, an existing sensor for detecting a wheel speed or a sensor for detecting a yaw acceleration, the range B corresponding to a range which can be achieved by the steering shaft 24 of which rotation is restricted by the lock mechanism 70. When the process of step 132 is completed, the process subsequent to step 128 is performed.

According to the routine shown in FIG. 11, in the case where the absolute angle δ of the steering shaft 24 at the time of the ignition key being pulled out of the keyhole 80a last time is stored when the ignition key is shifted from the IG OFF state to the ACC state, an angle corresponding to the angular position θ at every 360°/(m−n) detected based on the output difference of the pair of resolver sensors 60 and 62 at the time of the shift of the ignition key from the IG OFF state to the ACC state can be detected as an absolute angle of the steering shaft 24 in the range of 360°/N of the absolute angle which includes the stored absolute angle and the steering shaft 24 can achieve.

As mentioned above, in the present embodiment, since the axial multiplication angles n× and m× of the output signals of the pair of resolver sensors 60 and 62 and the number N of the lock holes of the lock mechanism 70 satisfy the relationship (m−n)≦N, the angle range 360°/N of rotation allowable to the steering shaft 24 which is restricted by the lock mechanism 70 is equal to or smaller than the angle range 360°/(m−n) in which the output differences of the pair of resolver sensors 60 and 62 does not have the same level.

In this case, the output differences of the resolver sensors 60 and 62 cannot be at the same level at a plurality of different angles within the angle range in which the rotation of the steering shaft 24 restricted by the lock mechanism 70 is permitted, and the output differences and the angles correspond one-to-one. Therefore, according to the above-mentioned processing, the absolute angle δ of the steering shaft 24 can be uniquely detected.

It becomes unnecessary to provide the detector for detecting the absolute angle δ other than first and second resolver sensors 60 and 62, if the relationship between the lock mechanism 70 and the pair of resolver sensors 60 and 62 is used as a method of detecting the absolute angle δ of the steering shaft 24. Therefore, according to the present embodiment, it is possible to detect the absolute angle δ of the steering shaft 24 with a simple structure as compared to a structure using other detectors, thereby reducing an increase in a manufacturing cost and eliminating a space for mounting such detectors.

Moreover, since the lock mechanism 70 restricts the rotation of the steering shaft 24 when the ignition key is pulled out of the keyhole 80a, if an absolute angle δ is stored at the time when the ignition key is pulled out of the keyhole 80a like the present embodiment, it becomes possible to detect the absolute angle it becomes possible to detect the absolute angle δ of the steering shaft 24 even when the power of the ECU 64 or the first and second resolver sensors 60 and 62 is turned off thereafter and until the time of canceling the restriction in rotation of the steering shaft 24 by the lock mechanism 70 due to the shift of the ignition key from the IG OFF state to the ACC state. Therefore, according to the present embodiment, a reduction in a power consumption can be attempted as compared to the structure in which a power of the ECU 64 and the like is continuously turned on so as to detect the absolute angle δ of the steering shaft 24, and an increase in the power consumption due to an increase in the dark current can be reduced.

Moreover, in the present embodiment, the absolute angle δ of the steering shaft 24 can be detected by using the relationship between the range of absolute angle which includes the absolute angle δ stored at the time the ignition key is pulled out of the keyhole 80a when the ignition key shifts from the IG OFF state to the ACC state and can be achieved by the steering shaft 24 and the angular position θ at every 360°/(m−n) based on the output difference of the pair of resolver sensors 60 and 62. For this reason, according to the present embodiment, the detection of the absolute angle δ of the steering shaft 24 can be promptly performed after a power of the vehicle is turned on.

Therefore, according to the vehicle steering apparatus 20 of the present embodiment, the detection of the absolute angle of the steering shaft can be promptly performed after a power is turned on by a simple structure without increasing power consumption.

It should be noted that in a structure like the present embodiment in which the absolute angle δ at the time of the ignition key of which lock mechanism 70 can restrict the rotation of the steering shaft 24 being pulled out of the key hole 80a is stored so as to detect the absolute angle δ of the steering shaft 24, it is necessary to continuously perform the determination as to whether or not the ignition key is pulled out of the keyhole 80a after the ignition key is operated to IG OFF until an affirmative determination is made. However, if it takes a long time until the ignition key is pulled out of the keyhole 80a after the ignition key is operated to TG OFF, an increase in the power consumption will arise. Especially, since it is general that a power of a vehicle is turned off after the ignition key is operated to TG OFF, a reduction in a voltage may occur due to consumption of electric power stored in the vehicle battery.

On the other hand, in the present embodiment, in the case where a predetermined time 10 has elapsed until it is determined that the ignition key is being pulled out of the keyhole 80a after the ignition key was shifted from the ACC state to the IG OFF state, the determination process is stopped, and the detection of the absolute angle δ of the steering shaft 24 using the relationship between the lock mechanism 70 and the output signals of the pair of resolver sensors 60 and 62 on the assumption that there is no storage of the absolute angle δ of the steering shaft 24 at the time the ignition key is pulled out of the keyhole 80a. For this reason, according to the present embodiment, in detecting the absolute angle δ of the steering shaft 24, the power consumption after IG OFF can be prevented from being increased, and a voltage drop of the vehicle battery due to an increase in the dark current can be prevented.

Further, in the present embodiment, in order for n× and m× of the output signals of the pair of resolver sensors 60 and 62 and the maximum torsion angle β of the torsion bar 38 as a whole satisfying the relationship (360°/n−360°/m)>β as mentioned above, if twist of the maximum torsion angle ±β/2 occurs in left and right directions in the torsion bar 38, it can be prevented that a range which can be taken by the output difference of the pair of resolver sensors 60 and 62, which is determined by the output signal of the second sensor 60 with respect to each candidate of the angular position θ of the steering shaft 24 which appears at every 360°/n in the output signal of the first resolver sensor 60, overlaps with the range which the output difference with respect to the adjacent candidate. For this reason, according to the vehicle steering apparatus 20 of the present embodiment, there is no erroneous detection of the absolute angle of the steering shaft 24, and the detection can be accurately performed.

It should be noted that, in the above-mentioned first embodiment, the first and the second resolver sensors 60 and 62 constitute a pair of sensors or resolver sensors. Additionally, (m−n), which is a difference between the axial multiplication angles of the first and second resolver sensors, is equivalent to a factor "k" and the location of each of the lock holes 76 and 78 provided around the input shaft 34 corresponds to a "locking position". Further, the upper shaft 40 and the lower shaft 42 corresponds to a "torsion part of a steering shaft", and the time t0 corresponds to a "predetermined time".

Additionally, in the above-mentioned first embodiment, "angular position detecting means" is realized by the ECU 64 detecting the angular position of the steering shaft 42 based on the output difference of the first and second resolver sensors 60 and 62. Moreover, "absolute angle detecting means" is realized by the ECU 64 executing the process of step 130 in the routine shown in FIG. 11, and "key determining means" is realized by the ECU 64 executing the process of step 104 in the routine shown in FIG. 10.

In the above-mentioned first embodiment, although the axial multiplication angles n× and m× of the output signals of the pair of resolver sensors 60 and 62 and the number N of the lock holes of the lock mechanism 70 are set so as to satisfy the relationship (m−n)≦N, instead of such a relationship, it may be preferable to set them so as to satisfy a relationship (m−n)+1<=N.

Namely, since the lock holes 76 and 78 of the lock mechanism 70 have a diameter larger than the lock bar 72 so that the lock bar 72 can be inserted therein, it may happen a case in which the steering shaft 24 rotates more than the angle range of 360°/N by a small angle, in which a rotation of the steering axis 24 is supposed to be permitted after the restriction of rotation of the steering shaft 24 by the lock mechanism 70 is permitted. If such a case happens, even if the rotation of the steering shaft 24 is restricted by the lock mechanism 70, the angle range in which the steering shaft can rotate may not be less than the angle range 360°/(m−n) in which the output differences of the pair of resolver sensors 60 and 62 do not have the same level, and, thus, the absolute angle δ of the steering shaft 24 cannot be uniquely detected.

On the other hand, if the above-mentioned parameters m, n and N are set so as to satisfy the relationship (m−n)+1=N, the number N of the lock holes around the steering shaft 24 is increased by 1 as compared to the structure which satisfies the relationship (m−n)=N. Thereby, the angle range, in which the steering shaft 24 can rotate when the rotation is restricted by the lock mechanism 70, becomes narrow. Therefore, it is prevented that the angle range 360°/N cannot be set to be smaller than the angle range 360°/(m−n), in which the output differences of the pair of resolver sensors 60 and 62 do have the same level, and, thus, the absolute angle δ of the steering shaft 24 can be positively and uniquely detected.

Additionally, although the above-mentioned embodiment, the left and right maximum torsion angles permitted to the torsion bar 38 are set to ±β/2 so that the maximum torsion angle of the torsion bar 38 as a whole is set to be β, effects the same as the present embodiment can be achieved by setting the maximum torsion angle of the torsion bar 38 as a whole to be β even when the left and right maximum torsion angles do not have the same absolute value.

Further, although, in the above-mentioned first embodiment, the steering shaft 24 has the torsion bar 38 and the absolute angle δ of the steering shaft 24 is detected using the output difference of the first and second resolver sensors 60 and 62 which are provided to the respective upper axis 40 and lower axis 42, it is also possible to apply to a structure in which the steering shaft does not have a torsion bar and the absolute angle of the steering axis is detected using an axial multiplication angle k× of the output signal of a single resolver sensor provided to the steering shaft.

Namely, in the above-mentioned structure, the axial multiplication angle k× of the output signal of the resolver sensor and the number N of the lock mechanism 70 are set so as to satisfy a relationship k≦N (preferably, k+1≦N), and, in the range 360°/N of the absolute angle which includes the stored absolute angle δ and the steering axis can realize after the ignition key is pulled out of the keyhole 80a, and the angle corresponding to the angular position θ at every 360°/k detected based on the output signal of the resolver sensor at the time the ignition key shifts from the IG OFF state to the ACC state is detected as the absolute angle of the steering shaft 24. In this case, since the angle range 360°/n of rotation permitted to the steering shaft 24 which is restricted by the lock mechanism 70 is equal to or less than the angle range 360°/k in which the output signals of the resolver sensor do not have the same level, the absolute angle δ of the steering shaft 24 can be uniquely detected.

A description will now be given, with reference to FIG. 1 and FIGS. 12 through 14, of a second embodiment of the present invention.

The system according to the present embodiment can be achieved by using a magnetic resistance sensor (MR sensor) having a magnetic resistance element of which resistance value changes in response to a magnetic field applied from outside instead of the first and second resolver sensors 60 and 62 in the above-mentioned structure shown in FIG. 1 so as to detect an absolute angle δ of the steering shaft 24 and angular positions of the upper and lower axes 40 and 42.

Figure 12:
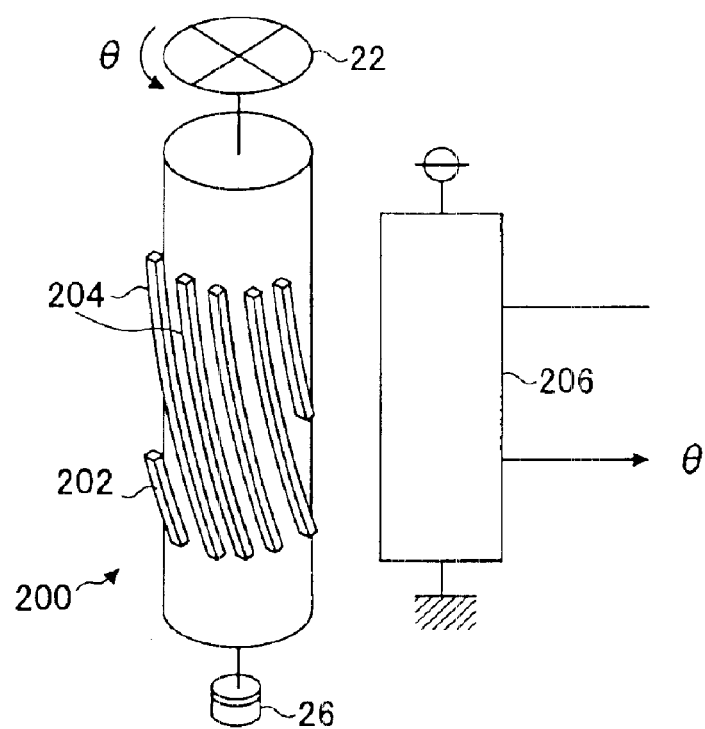
FIG. 12 is an illustration of a part of a vehicle steering apparatus according to a second embodiment of the present invention.

FIG. 12 shows a structure of a part of the vehicle steering apparatus 200 according to the second embodiment of the present invention. It should be noted that, in FIG. 12, parts that are the same as the parts shown in FIG. 1 are given the same reference numerals, and descriptions thereof will be omitted. As shown in FIG. 12, the vehicle steering apparatus 200 is equipped with a steering shaft 202. The steering wheel 22 is fixed to an end of the steering shaft 202, and the steering gear box 26 is connected and fixed to the other end of the steering shaft 202. The steering shaft 202 rotates together with rotation of the steering wheel 22.

The steering shaft 202 is provided with k projections 204 arranged along a spiral on the outer surface thereof at equal intervals (for example, 8 projections). The projections 204 are arranged to form k saw-tooth waveforms when the outer surface of the steering shaft 202 is developed. The projections 204 are formed of a magnetic material such as carbon steel, silicon steel or Ba ferrite, and generates a magnetic field in the surrounding area.

Additionally, the vehicle steering apparatus 200 is equipped with an MR sensor 206 which is provided on a body fixed part of the outer surface of the steering shaft 202. The MR sensor 206 is positioned parallel to the steering shaft 202 with a predetermined gap therebetween. The MR sensor 206 has a magnetic resistance element of which resistance value changes in response to an intensity of magnetic field applied from outside, and outputs a divided voltage value of a voltage-dividing circuit comprising the magnetic resistance element and a resistor having a constant resistance value.

In the above-mentioned structure, when the steering shaft 202 rotates, the positions of the projections 204 in the axial direction of the steering shaft 202 change in response to the rotation of the steering shaft 202. The change in the positions of the projections 204 along the axial direction shows a saw-tooth waveform having k cycles during one rotation of the steering shaft relative to the vehicle body so that the projections 204 are at the same positions along the axial direction for each rotation of 360°/k.

Figure 13:
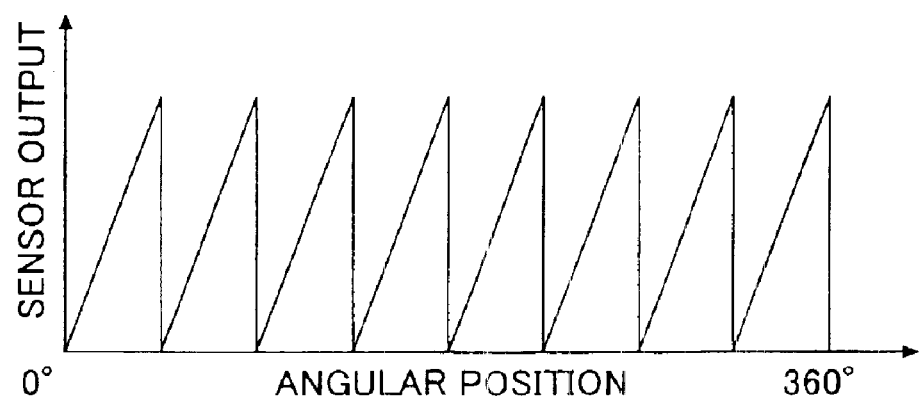
FIG. 13 is a graph showing a relationship between an angular position of a steering shaft and an output of an MR sensor when the axial multiplication angle of the MR sensor is 8×.

FIG. 13 shows a graph representing a relationship between the angular position θ of the steering shaft 202 and an output of the MR sensor 206 when an axial multiplication angle of the output signal of the MR sensor 206 is 8×. A magnetic field corresponding to an axial position of the opposing projection 204 of the steering shaft 202 is applied to the MR sensor 206. An intensity of the magnetic field applied to the MR sensor increases as the axial position of the opposing projection 204 of the steering shaft 202 is closer to the end on the side of the steering sensor 22, while the intensity of the magnetic field decreases as the projection 204 is closer to the end on the side of the steering gear box 26.

As mentioned above, the MR sensor 206 has the magnetic resistance element of which resistance value changes in response to an intensity of the applied magnetic field. Therefore, as shown in FIG. 13, the MR sensor 206 outputs the saw-tooth waveform signal having the k× (=8) cycle, that is, the same level signal for each 360°/k rotation (for example, 360°/8=45°) in response to the axial position of the opposing projection 204 of the steering shaft 202 during one rotation of the steering shaft 202 relative to the vehicle body. In this structure, the output signal of the MR sensor 206 becomes a signal having an axial multiplication angle k× which indicates cycles per one rotation of the steering shaft 202.

That is, the output signal of the MR sensor 206 corresponds to at every 360°/k on one-to-one basis with respect to the angular position of the steering shaft 202. The above-mentioned ECU 64 is connected to the MR sensor 206. The output signal of the MR sensor 206 is supplied to the ECU 64. Therefore, the ECU 64 can detect the angular position θ of the steering shaft 202 for each 360°/k based on the output signal of the MR sensor 206.

Similar to the above-mentioned embodiment, the vehicle steering apparatus according to the present embodiment comprises the lock mechanism 70 which regulates the rotation of the steering shaft 202. The lock mechanism 70 comprises the lock bar 72 which is provided on the vehicle body side and extends in a radial direction of the steering shaft 202 and N lock holes which is provided in the lock holder 74 rotating together with the steering shaft 202. In this structure, if the steering wheel 22 is rotated by a maximum of 360°/N after the ignition key is set to IG OFF and is removed from the key hole 80a, the rotation of the steering shaft 202 is positively restricted by the lock mechanism 70.

Therefore, in a case where the axial multiplication angle of the output signal of the MR sensor 206 is "k", if the number of the lock holes of the lock mechanism 70 provided around steering shaft 202 is equal to or greater than k, by setting an angle range of 360°/N which is permitted to the steering shaft 202 and includes a stored absolute angle based on the absolute angle when the ignition key is pulled out of the keyhole 80a, the absolute angle δ of the steering shaft 202 can be uniquely detected according to the relationship between the set angle range and the rotation angle range of the steering shaft 203 detected based on the output signal of the MR sensor 206 for each 360°/k.

Thus, in the present embodiment, the axial multiplication angle k× of the output signal of the MR sensor 206 and the number N of the lock holes of the lock mechanism provided around the steering shaft 202 at equal intervals are set so as to satisfy the relationship k≦N. For example, when the axial multiplication angle is 8×, the number N of the lock holes is set equal to or greater than 8. Additionally, when the ignition key is pulled out of the keyhole 80a, the absolute angle δ of the steering shaft 202 at the time of the removal is stored. Thereafter, an angle corresponding to the angular position at every 360°/k is detected as the absolute angle of the steering shaft 202, the angular position being detected based on the output signal of the MR sensor 206 at the time of shifting from the IG OFF state to the ACC state of the ignition key in the range of 360°/N which includes stored absolute angle δ and can be realized by the steering shaft 202.

In this structure, the angle range (=360°/N) of the rotation permitted to the steering shaft 202 when restricted by the lock mechanism 70 is equal to or smaller than the angle range (=360°/k) in which the output signal of the MR sensor 206 does not have a constant level. In this case, the output signal of the MR sensor 206 is not maintained at the same level in the angle range permitted to the steering shaft 202, and, thus, according to the vehicle steering apparatus 200 of the present embodiment, the absolute angle δ of the steering shaft 202 can be uniquely detected.

Thus, if the relationship between the lock mechanism 70 and the output signal of the MR sensor 206 as a method of detecting the absolute angle δ of the steering shaft 202, there is no need to provide a sensor for detecting the absolute angle δ other than the MR sensor 206 and the projections 204 provided on the outer surface of the steering shaft 202. Therefore, according to the vehicle steering apparatus 200 of the present embodiment, detection of the absolute angle can be achieved by a simple structure as compared to a structure in which a separate detector is used, and, thereby, an increase in the manufacturing cost can be reduced, which enables omitting a space to mount such a detector.

Additionally, since the absolute angle δ is stored at the time of pulling the ignition key out of the keyhole 80a. Thereafter, if the power supply of the ECU 64 or the MR sensor 206 is turned off until the time the restriction of rotation of the steering shaft 202 is cancelled, a reduction in the power consumption can be attempted as compared to the case where power supply is continuously turned on in detecting the absolute angle of the steering shaft 202, and, thus, an increase in power consumption due to an increase in the dark current can be suppressed.

Additionally, in the present embodiment, the absolute angle δ is detected using the relationship between the range of the absolute angle which the steering shaft 24 can realize and contains the absolute angle stored when the ignition key is pulled out of the keyhole 80a after the ignition key is shifted from the IG OFF state to the ACC state. Therefore, according to vehicle the steering apparatus 200 of the present embodiment, similar to the vehicle steering apparatus 20 according to the above-mentioned first embodiment, the detection of the absolute angle of the steering shaft 202 can be achieved by a simple structure without increasing power consumption and the detection can be performed immediately after the power supply is turned on.

Further, also in the present embodiment, if a predetermined time t0 has passed after the ignition key is shifted from the ACC state to the IG OFF state and until the ignition key is determined to be pulled out of the keyhole 80a, the determination e can be stopped and the detection of the absolute angle δ of the steering shaft 202 using the relationship between the lock mechanism 70 and the output signal of the MR sensor 206 may be prohibited as there is no storage of the absolute angle δ of the steering shaft when the ignition key is pulled out of the keyhole 80a. This is because an increase in the power consumption caused by a case where it takes a long period of time for the ignition key after it is operated to the IG OFF state until the ignition key is pulled out of the keyhole 80a can be prevented, which results in prevention of a voltage drop of the vehicle battery.

It should be noted that in the above-mentioned second embodiment, the positions of the lock holes provided around the steering shaft 202 corresponds to the lock positions. Additionally, the angular position detecting means is achieved by the ECU 64 detecting the angular position of the steering shaft 202 based on the output signal of the MR sensor 206, and the absolute angle detecting means can be achieved by the ECU 64 performing the process of step 130 in the routine shown in FIG. 11.

In the meantime, in the above-mentioned second embodiment, although the axial multiple angle k× and the number N of the lock holes are set so as to satisfy the relation ship k≦N, they may be set so as to satisfy a relationship k+1≦N instead of k≦N. If the relationship k+1≦N is satisfied, the angle range in which the steering shaft 202 can rotate when the rotation is restricted by the lock mechanism 70 can be smaller than that of the case where the relationship k=N is satisfied by increasing the number N of the lock holes around the steering shaft 202 by 1. In this respect, according to the structure in which the relationship k+1≦N is satisfied, it can be positively prevented that the angle range 360°/N in which the steering shaft can rotate when the rotation is restricted is smaller than the angel range 360°/k in which the output signal of the MR sensor 206 does not maintain the same level due to variation in the size of the lock holes, and the absolute angle δ of the steering shaft 202 can be positively and uniquely detected.

Moreover, although in the above-mentioned second embodiment, the steering shaft 202 does not have a torsion bar and the absolute angle δ of the steering shaft 202 is detected by using the axial multiplication angle k× of the output signal of the MR sensor 206 solely provided in response to the steering shaft 202, it is possible that the steering shaft has a torsion bar as is in the above-mentioned first embodiment so as to detect the absolute angle of the steering shaft by using a difference in outputs between first and second MR sensors provided correspondingly to upper and lower axes, respectively.

Figure 14:
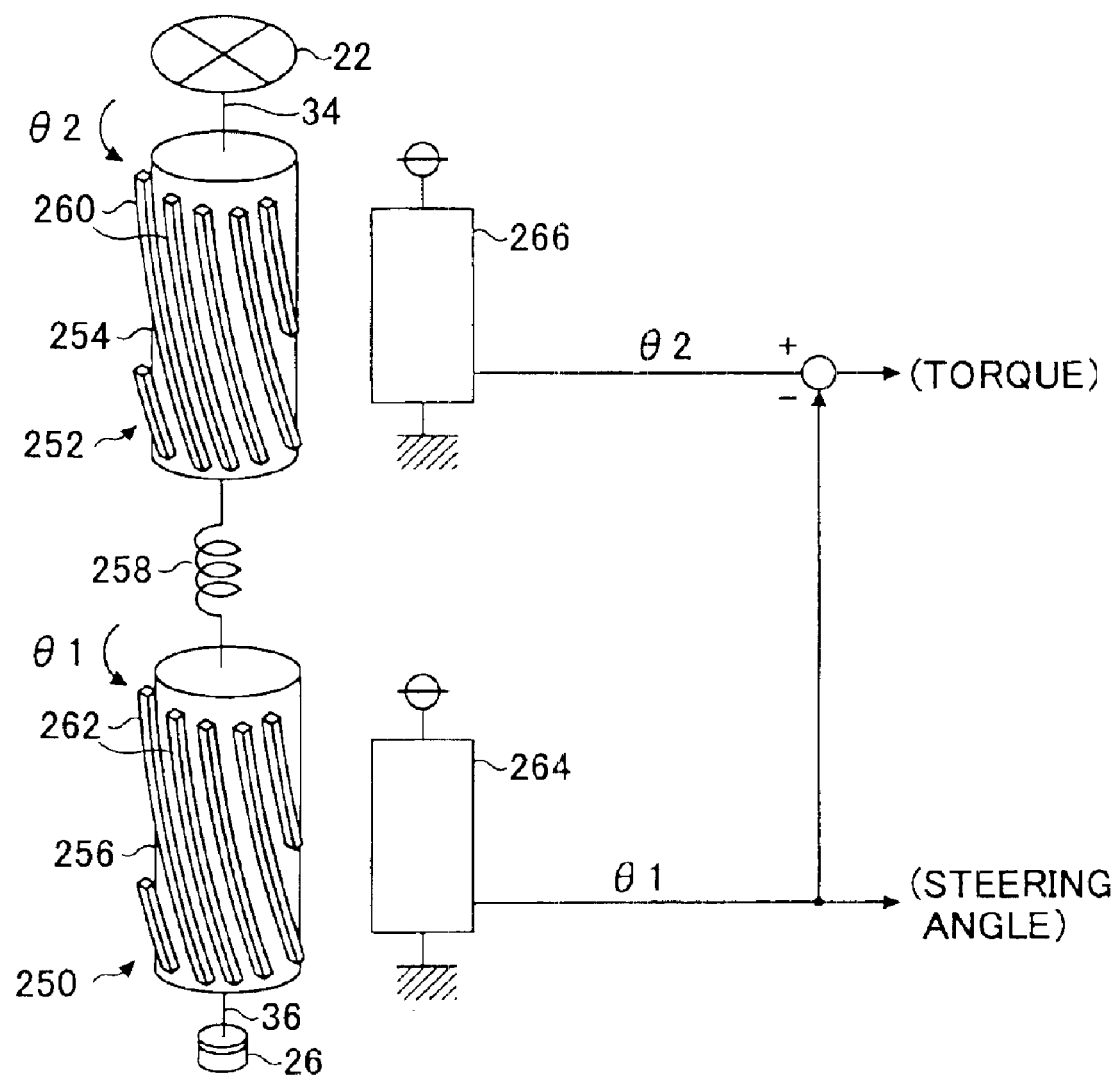
FIG. 14 is an illustration of a par of a variation of the vehicle steering apparatus shown in FIG. 12.

FIG. 14 shows a part of a vehicle steering apparatus 250, which is the above-mentioned variation. It should be noted that, in FIG. 14, parts that are the same as the parts shown in FIGS. 1 and 12 are given the same reference numerals, and descriptions thereof will be omitted. The vehicle steering apparatus 250 is equipped with a steering shaft 252. The steering shaft 252 comprises an upper axis 254 connected to the input shaft 34, a lower axis 256 connected to the output shaft 36, and a torsion bar 258 interposed between the upper axis 254 and the lower shaft 256. Relative rotation of the upper axis 254 and the lower axis 256 about the axis to each other is restricted by a mechanical stopper within a predetermined torsion angle. That is, the torsion angle of the torsion bar 258 is restricted within a predetermined range (the maximum torsion angle β as a whole).

The upper axis 254 is provided with m projections 260 along a spiral line on the outer surface thereof at equal intervals. On the other hand, the lower axis 256 is provided with n (n<m) projections 260 along a spiral line on the outer surface thereof at equal intervals. The projections 260 and 262 are arranged so as to form m and n saw-tooth waveforms, respectively, when the outer surfaces of the upper axis 254 and the lower axis 256 are developed. Each projection 260 and 262 is formed of a magnetic material such as carbon steel, silicon steel or Ba ferrite, and generates a magnetic field in the surrounding area.

Additionally, the vehicle steering apparatus 250 is provided with an MR sensor 264 provided to a vehicle body fixing portion of the outer surface side of the lower axis 256 and an MR sensor 266 provided to a vehicle body fixing portion of the outer surface side of the upper axis 254. Both the MR sensors 264 and 266 are positioned parallel to the corresponding axes 256 and 254 with a predetermined gap therebetween. Each of the MR sensor 264 and 266 has a magnetic resistance element of which resistance value changes in response to an intensity of a magnetic field which is applied from outside, and outputs a divided voltage of a voltage-dividing circuit comprising the magnetic resistance element and a resistor having a constant resistance. Hereinafter, the MR sensor on the side of the lower axis 256 and the MR sensor on the side of the upper axis 254 are referred to as a first MR sensor 264 and a second MR sensor 266, respectively.

In the above-mentioned structure, when the upper axis 254 rotates, the axial position of the projection 260 opposing the second MR sensor 266 in the upper axis 254 changes in association with the rotation of the upper axis 254. Additionally, when the lower axis 256 rotates, the axial position of the projection 262 opposing the first MR sensor 264 in the lower axis 255 in association with the rotation of the lower axis 256. The changes in the axial positions of the projections 260 and 262 produce saw-tooth waveforms of m cycle and n cycle during one rotation of the upper axis 254 and the lower axis 256 relative to the vehicle body so that the axial positions of the projections 260 and 262 are at the same position for each rotation of 360°/m and 360°/n, respectively.

A magnetic field is applied to the first MR sensor in response to the axial position of the opposing projection 256 of the lower axis 256. On the other hand, a magnetic field is applied to the second MR sensor in response to the axial position of the opposing projection 254 of the upper axis 254. The intensity of the magnetic fields which is applied to the MR sensors 264 and 266 is increased as the axial positions of the opposing projections 262 and 260 of the axes 256 and 254 are closer to the end of the side of the steering senor 22, while the intensity is decreased as the axial positions are closer to the end of the side of the steering gear box 26.

As mentioned above, each of the MR sensors 266 and 264 has the magnetic resistance element of which resistance value changes in response to the intensity of the magnetic field applied thereto, respectively. Therefore, the MR sensors 266 and 264 output saw-tooth waveform signals of n cycles and m cycles, that is, the same level signals at every 360°/m and 360°/n rotation during one rotation of the upper axis 254 and the lower axis 256 with respect to the vehicle body in response to the axial positions of the opposing projections 260 and 262 of the axes 254 and 256, respectively. In this structure, the output signal of the first MR sensor 264 becomes a signal having an axial multiplication angle n× which indicates cycles per one rotation of the lower axis 256, and the output signal of the second MR sensor 266 becomes a signal having an axial multiplication angle m× which indicates cycles per one rotation of the upper axis 254.

In the present embodiment, the axial multiplication angles of the output signals of the pair of the MR sensors 266 and 264 and the number N of the lock holes of the lock mechanism 70 are set so as to satisfy a relationship (m−n)≦N, and the axial multiple angles m× and n× and the maximum torsion angle β of the torsion bar 38 as a whole are set so as to satisfy a relationship (360°/n−360°/m)>β.

Also in such a structure, like the above-mentioned first embodiment, the angle range (=360°/N) of rotation permitted to the steering shaft 252 when restricted by the lock mechanism 70 is equal to or smaller than the angle range (=360°/(m−n)) in which the difference in outputs between the first and second MR sensors 264 and 266 does not have the same level. In this case, since the difference in the outputs between the MR sensors 264 and 266 does not be the same level within the angle range in which the rotation of the steering shaft 252 is permitted. Thus, in the vehicle steering apparatus according to the present embodiment, the absolute angle δ of the steering shaft 252 can be uniquely detected.

Additionally, also in such a structure, if a torsion of the maximum torsion angle β is generated in the torsion bar as a whole, it can be avoided that the range of the output difference between the pair of the MR sensors 264 and 266, which is determined by the output signal of the second MR sensor with respect to each candidate of the angular position of the steering shaft 252 that appears at every 360°/n rotation by the output signal of the first MR sensor 264, overlaps with the range of the output difference between the adjacent candidates.

For this reason, according to the vehicle steering apparatus 250 of the present variation, there is no erroneous detection of the absolute angle δ of the steering shaft 252, and the detection can be performed with sufficient accuracy. It should be noted that although, in the above-mentioned first and second embodiments, the resolver sensor, which comprises a resolver stator and a resolver rotor, or the MR sensor, which comprises a magnetic resistance element of which resistance value changes in response to a magnetic field applied from outside, is used as a sensor for detecting the absolute angle δ and the angular positions of the upper axis and the lower axis, the present invention is not limited to such a structure, and a sensor which outputs a saw-tooth waveform signal having a plurality of cycles per one rotation may be used.

The present invention is not limited to the specifically disclosed embodiments, and variations and modifications may be made without departing from the scope of the present invention.

The present application is based on Japanese priority applications No. 2002-001467 filed Jan. 8, 2002 and No. 2002-370890 filed Dec. 20, 2002, the entire contents of which are hereby incorporated by reference.

What is claimed is:

1. A steering apparatus for a vehicle comprising:
   a sensor which outputs an output signal corresponding to an angular position of a steering shaft of the vehicle; and
   a lock mechanism which restricts rotation of the steering shaft at locking positions provided around the steering shaft at equal intervals,
   wherein an axial multiplication angle k× of the output signal of said sensor and a number N of the locking positions provided around the steering shaft satisfy a relationship represented by k≦N.

2. The steering apparatus for a vehicle as claimed in claim 1, further comprising:
   angular position detecting means for detecting an angular position of said steering shaft based on the output signal of said sensor; and
   absolute angle detecting means for detecting an absolute angle of said steering shaft based on a relationship between the absolute angle of said steering shaft at a time a restriction of rotation of said steering shaft by said lock mechanism is permitted and the angular position of said steering shaft detected by said angular position detecting means at a present time.

3. The steering apparatus for a vehicle as claimed in claim 2, further comprising key determining means for determining whether an ignition key for the vehicle is pulled out of a keyhole; and
   wherein said lock mechanism restricts rotation of said steering shaft when said ignition key is pulled out of the keyhole; and
   said absolute angle detecting means detects the absolute angle of said steering shaft based on a relationship between the absolute angle of said steering shaft at a time when said ignition key is pulled out of said keyhole and the angular position of said steering shaft detected by said angular position detecting means at a present time.

4. The steering apparatus as claimed in claim 3, wherein said key determining means stops a determining process when a predetermined time has passed after said ignition key is operated to turn off ignition, and thereafter the detection of said absolute angle detecting means is prohibited.

5. The steering apparatus as claimed in claim 1, wherein said sensor is a resolver sensor comprising a resolver stator and a resolver rotor each having a winding.

6. The steering apparatus as claimed in claim 1, wherein said steering shaft has projections which are provided along an outer surface thereof so as to generate a magnetic field, and said sensor has a magnetic resistance element of which resistance value changes in response to an intensity of an externally applied magnetic field.

7. A steering apparatus for a vehicle, comprising:
   a pair of sensors each of which outputs an output signal corresponding to an angular position of a torsion part of a steering shaft of the vehicle; and
   a lock mechanism which restricts rotation of the steering shaft at locking positions provided around the steering shaft at equal intervals,
   wherein axial multiplication angles m× and n× (m>n) of the output signals of said pair of sensors and a number N of the locking positions around said steering shaft satisfy a relationship represented by (m−n)≦N.

8. The steering apparatus for a vehicle as claimed in claim 7, wherein an allowable torsion angle β which is permitted to the torsion part of said steering shaft satisfies a relationship represented by (360°/n−360°/m)>β.

9. The steering apparatus for a vehicle as claimed in claim 8, further comprising:
   angular position detecting means for detecting an angular position of said steering shaft based on the output signals of said pair of sensors; and
   absolute angle detecting means for detecting an absolute angle of said steering shaft based on a relationship between the absolute angle of said steering shaft at a time a restriction of rotation of said steering shaft by said lock mechanism is permitted and the angular position of said steering shaft detected by said angular position detecting means at a present time.

10. The steering apparatus foe a vehicle as claimed in claim 7, further comprising:
    angular position detecting means for detecting an angular position of said steering shaft based on the output signals of said pair of sensors; and
    absolute angle detecting means for detecting an absolute angle of said steering shaft based on a relationship between the absolute angle of said steering shaft at a time when a restriction of rotation of said steering shaft by said lock mechanism is permitted and the angular position of said steering shaft detected by said angular position detecting means at a present time.

11. The steering apparatus for a vehicle as claimed in claim 10, further comprising key determining means for determining whether or not an ignition key for the vehicle is pulled out of a keyhole, and wherein said lock mechanism restricts rotation of said steering shaft when said ignition key is pulled out of the keyhole; and said absolute angle detecting means detects the absolute angle of said steering shaft based on a relationship between the absolute angle of said steering shalt at a time when said ignition key is pulled out of said keyhole and the angular position of said steering shaft detected by said angular position detecting means at a present time.

12. The steering apparatus as claimed in claim 11, wherein said key determining means stops a determining process when a predetermined time has elapsed after said ignition key is operated to turn off ignition, thereby prohibiting the detection of said absolute angle detecting means.

13. The steering apparatus as claimed in claim 7, wherein said pair of sensors are resolver sensors comprising a resolver stator and a resolver rotor each having a winding.

14. The steering apparatus as claimed in claim 7, wherein said steering shaft has projections which are provided along an outer surface thereof so as to generate a magnetic field, and said sensor has a magnetic resistance element of which resistance value changes in response to an intensity of an externally applied magnetic field.

* * * * *